(12) United States Patent
Yamanaka et al.

(10) Patent No.: US 8,237,046 B2
(45) Date of Patent: Aug. 7, 2012

(54) DYE-SENSITIZED SOLAR CELL MODULE

(75) Inventors: Ryohsuke Yamanaka, Gojo (JP); Nobuhiro Fuke, Nara (JP); Atsushi Fukui, Kashiba (JP); Naoki Koide, Kashihara (JP); Liyuan Han, Nara (JO)

(73) Assignee: Sharp Kabushiki Kaisha, Osaka (JP)

( * ) Notice: Subject to any disclaimer, the term of this patent is extended or adjusted under 35 U.S.C. 154(b) by 1176 days.

(21) Appl. No.: 10/586,648

(22) PCT Filed: Jan. 19, 2005

(86) PCT No.: PCT/JP2005/000604
§ 371 (c)(1), (2), (4) Date: Dec. 14, 2007

(87) PCT Pub. No.: WO2005/069424
PCT Pub. Date: Jul. 28, 2005

(65) Prior Publication Data
US 2008/0202585 A1 Aug. 28, 2008

(30) Foreign Application Priority Data

Jan. 20, 2004 (JP) ................. 2004-011915
Apr. 15, 2004 (JP) ................. 2004-120530

(51) Int. Cl.
*H01L 31/00* (2006.01)
(52) U.S. Cl. ........................ 136/252; 136/263
(58) Field of Classification Search .......... 136/263, 136/252; 257/431, 40
See application file for complete search history.

(56) References Cited

U.S. PATENT DOCUMENTS

| | | | |
|---|---|---|---|
| 4,461,922 A * | 7/1984 | Gay et al. | 136/249 |
| 5,322,572 A * | 6/1994 | Wanlass | 136/249 |
| 6,310,282 B1 * | 10/2001 | Sakurai et al. | 136/263 |
| 2002/0134426 A1 * | 9/2002 | Chiba et al. | 136/263 |

(Continued)

FOREIGN PATENT DOCUMENTS

JP 2664194 6/1997
(Continued)

OTHER PUBLICATIONS

Zaban, Arie et al., "Relative Energetics at the Semiconductor/Sensitizing Dye/Electrolyte Interface", Nov. 1997, Journal of Physical Chemistry, vol. 102, pp. 452-460.*

(Continued)

*Primary Examiner* — Basia Ridley
*Assistant Examiner* — Tamir Ayad
(74) *Attorney, Agent, or Firm* — Nixon & Vanderhye P.C.

(57) ABSTRACT

The present invention aims to improve the photoelectric current of a dye-sensitized solar cell module and produce a high power dye-sensitized solar cell. The present invention provides a dye-sensitized solar cell module comprising at least two photoelectric conversion elements each comprising a transparent conductive layer, a porous photoelectric conversion layer adsorbing a dye, an electrolytic layer, a catalyst layer, and a conductive layer on a transparent substrate, wherein the respective photoelectric conversion elements are different in at least one among the layering order of the respective layers composing the photoelectric conversion elements; the type and composition of the materials for the respective layers; the particle diameter in the case the materials of the respective layers are granular; the thickness and width of the respective layers; the form of the respective layers; and the open circuit voltage of the photoelectric conversion elements, and thereby the aim is achieved.

28 Claims, 4 Drawing Sheets

U.S. PATENT DOCUMENTS

| | | | |
|---|---|---|---|
| 2003/0140959 A1* | 7/2003 | Gaudiana et al. | 136/244 |
| 2003/0230337 A1* | 12/2003 | Gaudiana et al. | 136/256 |
| 2004/0074531 A1* | 4/2004 | Matsui et al. | 136/244 |
| 2005/0268957 A1* | 12/2005 | Enomoto et al. | 136/244 |

FOREIGN PATENT DOCUMENTS

| | | |
|---|---|---|
| JP | 11-273753 | 10/1999 |
| JP | 2000-91609 | 3/2000 |
| JP | 2001-160427 | 6/2001 |
| JP | 2003-31270 | 1/2003 |
| JP | 2003-261540 | 9/2003 |
| JP | 2003-333757 | 11/2003 |
| WO | 97/16838 | 5/1997 |
| WO | WO 9963599 | * 12/1999 |
| WO | 02/052654 | 7/2002 |

OTHER PUBLICATIONS

Nazeeruddin, Md. K. et al., "Investigation of Sensitizer Adsorption and the Influence of Protons on Current and Voltage of a Dye-Sensitized Nanocrystalline TiO2 Solar Cell", Dec. 2002, Journal of Physical Chemistry, vol. 107, pp. 8981-8987.*

Gratzel, Michael, "Perspectives for Dye-Sensitized Nanocrystalline Solar Cells", 2000, Progress in Photovoltaics: Research and Applications, vol. 8, pp. 171-185.*

Boschloo, Gerrit et al., "Optimization of dye-sensitized solar cells prepared by compression method", Sep. 2001, Journal of Photochemistry and Photobiology A: Chemistry 148, pp. 11-15.*

International Search Report for PCT/JP2005/000604 dated May 10, 2005.

Meyer et al., *Progress in Nanocrystalline Organic Photovoltaic Cells*, Proceedings of SPIE, vol. 4801, 2003, pp. 48-55.

Sommeling et al., *Manufacturing of Dye Sensitized Solar Cells on Larger Scale*, edited by Shuji Hayase & Akira Fujishima, issued by Gijutsu Kyoiku Shuppan Sha, pp. 205-217, 2003.

English translation of the International Preliminary Report on Patentability mailed Oct. 26, 2006 in corresponding PCT Application No. PCT/JP2005/000604.

* cited by examiner

Substrate X

Substrate Y

DYE-SENSITIZED SOLAR CELL MODULE

This application is the US national phase of international application PCT/JP2005/000604 filed 19 Jan. 2005, which designated the U.S. and claims priority to JP 2004-011915 filed 20 Jan. 2004, and JP 2004-120530 filed 15 Apr. 2004, the entire content of each of which is hereby incorporated by reference.

FIELD OF THE INVENTION

The present invention relates to dye-sensitized solar cell module.

BACKGROUND ART

Solar cells capable of converting sunray into electric power as energy sources in place of fossil fuel have been drawing attention. Presently, solar cells whose commercial use has partially been begun are solar cells using crystalline silicon substrates and thin film silicon solar cells. However, the former costs high for fabrication of the silicon substrates, and the latter requires various kinds of semiconductor gases and complicated apparatuses and the high production cost still remains as a problem. Therefore, it has been tried to lower the cost per electric power output by increasing the efficiency of the photoelectric conversion of both types of solar cells, but the above-mentioned problem has not been solved yet.

As a new type solar cell, Japanese Patent No. 2,664,194 discloses a wet type solar cell based on photo-induced electron transfer of a metal complex. The wet type solar cell comprises a photoelectric conversion element using a photoelectric conversion material and an electrolytic material and sandwiched between two glass substrate. The photoelectric conversion material has an absorption spectrum in the visible light region by adsorbing a photosensitizing dye. In the wet solar cell, when light is radiated to the photoelectric conversion layer, photoelectron is induced and the electron is transferred to an electrode through an external electric circuit. The electron transferred to the electrode is turned back to the photoelectric conversion layer by being conveyed through ion in an electrolytic substance. Electric energy is outputted by repeat of such electron transfer.

A technique of a low cost fabrication method of the wet type solar cell based on the above-mentioned operation principle is disclosed in Japanese Patent Application Laid-Open No. 2000-91609. To explain the outline of the technique, first, a glass substrate in which a transparent conductive film (electrode) is formed is made ready. Further, a platinum conductive film (electrode) and a colloidal titanium dioxide power generation layer are formed on another substrate so flexible to be rolled so as to obtain a layered body. At the time of or after the layered body formation, the power generation layer is impregnated with an electrolytic solution. According to this technique, a single unit organic solar cell can be obtained.

Also, PCT WO 97/16838 pamphlet discloses, as shown in FIG. 7, a dye-sensitized solar cell module comprising a plurality of dye-sensitized solar cells connected in series. Practically, each dye-sensitized solar cell has a structure composed by successively layering a titanium oxide layer, an insulating porous layer, and a counter electrode on a glass substrate on which a transparent conductive film (electrode) is patterned into a strip-like form. The conductive layer of one dye-sensitized solar cell is arranged so as to contact with the counter electrode of another neighboring dye-sensitized solar cell to connect both solar cells in series.

Also, P. M. Sommeling et al. disclose a dye-sensitized solar cell module having a structure of W type series connection as shown in FIG. 8 in Development Technology of Dye-Sensitized Solar Cell, edited by Shuji HAYASE, & Akira FUJISHIMA, issued by Gijutsu Kyoiku Shuppan Sha, p. 205-217 (2003).

Practically, titanium oxide layers and platinum layers are alternately formed on each of two glass substrates on which a transparent conductive electrode is patterned into a strip-like form: the substrates are layered each other in a manner the titanium oxide layer and the platinum layer are set face to face: an insulating adhesive such as a resin is put between the respective pairs of the titanium oxide layers and the platinum layers: and the layered glass substrates are stuck to each other by the insulating adhesive to obtain each dye-sensitized solar cell. And a dye-sensitized solar cell module is produced by connecting such dye-sensitized solar cell in series.

However, the basic structure of the dye-sensitized solar cell described in Japanese Patent No. 2,664,194 is composed by injecting an electrolytic solution between two glass substrates. Accordingly, even if a solar cell with a small surface area can be produced on an experimental basis, it is difficult to apply the method for producing a solar cell with as a large surface area as 1 m-square. With respect to such a solar cell, if the surface area of one solar cell (unit cell) is enlarged, the generated current is increased proportionally to the surface area. However, the voltage is extremely decreased in the direction of the electric current flow in the transparent conductive film to be used as an electrode part and consequently, the inner series electric resistance of the solar cell is increased. As a result, there occurs a problem that fill factor (FF) in electric current-voltage property at the time of photoelectric conversion is decreased and accordingly the photoelectric conversion efficiency becomes low.

To solve the above-mentioned problem, it seems to be possible to form an integrated structure by bringing a first conductive layer of a rectangular unit cell employed for a module of amorphous silicon solar cells each comprising an amorphous silicon layer sandwiched between a first conductive layer and a second conductive layer into contact with a second conductive layer of a neighboring unit cell. However, in this structure, it is required to keep a certain gap so as to keep neighboring photoelectric conversion layers from one another. Generally, the conversion efficiency of an integrated solar cell module means the electric power generation efficiency per surface area of the module. Therefore, if the surface area of the gap is wide, the light comes into the gap does not contribute to the power generation and even if the conversion efficiency of unit cells composing a module is high, the conversion efficiency as a module becomes low. Accordingly, it is required to develop a production method of a module in which the gap between neighboring unit cells is narrowed.

In general, in an amorphous silicon type solar cell, integrated patterning is carried out by scribing with laser, but this technique application to a dye-sensitized solar cell is difficult. It is because a large quantity of dye is to be adsorbed in a photoelectric conversion layer of the dye-sensitized solar cell and therefore the layer is made of a porous material. The part of the porous material in which a fine pattern is formed with laser as described is inferior in the strength: and thus the fine pattern formation becomes impossible.

Further, there is another problem that use of laser increases the production cost.

To solve the above-mentioned problems, a porous photoelectric conversion layer is formed by a screen printing method in a solar cell described in PCT WO 97/16838 pamphlet as shown in FIG. 7. However, pattern formation is carried out by laser or air jet after formation of a porous photoelectric conversion layer and similar problems as described above are caused because of the similar reasons as described above. In FIG. 7, the reference numeral 41 denotes a transparent substrate; 42 denotes a transparent conductive film; 43 denotes a porous titanium oxide layer; 44 denotes an intermediate porous layer; 45 denotes a counter electrode; 46 denotes an insulating layer; 47 denotes a top cover for airtightly sealing an electric insulation liquid; and 48 and 49 denote terminals.

Also, in a solar cell shown in FIG. 8, since a titanium oxide layer and a light transmitting counter electrode are formed in the plane direction of one glass substrate having a transparent conductive film, regardless of the front or rear face of a solar cell module, a light receiving face can be set, however with respect to a solar cell having the light receiving face in the counter electrode side, since light is absorbed by the electrolytic solution in the solar cell as compared with the solar cell in which the counter electrode side does not become light receiving face, the incident light quantity is decreased to result in a problem of decreased of the electric current. Accordingly, the solar cell module produced by connecting solar cells in series has a problem that the properties of the solar cells composing the module cannot be exhibited at the maximum. In FIG. 8, the reference numerals 31 and 32 respectively denote a transparent substrate; 301, 302, and 303 respectively denote a transparent conductive film; 311, 312, and 313 denote an electrolytic solution; 321, 322, and 323 denote a porous titanium oxide layer; 331, 332, and 333 denote a catalyst layer; and 341, 342, and 343 denote an insulating layer.

DISCLOSURE OF THE PRESENT INVENTION

Problems to be Solved by the Invention

The present invention relates to a dye-sensitized solar cell module and provides a dye-sensitized solar cell with higher power than that of a conventional technique by improving constituent factors of a plurality of solar cells composing the module and accordingly solve the above-mentioned problems.

Means for Solving the Problems

Accordingly, the present invention provides a dye-sensitized solar cell module comprising at least two or more photoelectric conversion elements each comprising a transparent conductive layer, a porous photoelectric conversion layer adsorbing a dye, an electrolytic layer, a catalyst layer and a conductive layer on a transparent substrate, wherein the respective photoelectric conversion elements are different in at least one among the layering order of the respective layers composing the respective photoelectric conversion elements; the type and the composition of the materials of the respective layers; the particle diameter in the case the materials of the respective layers are granular; the thickness and the width of the respective layers; the form of the respective layers; and the open circuit voltage of the respective photoelectric conversion elements.

Practically, the present invention provides a dye-sensitized solar cell module comprising first photoelectric conversion elements each having a transparent substrate in the light receiving face side and a transparent conductive layer, a porous photoelectric conversion layer adsorbing a dye, an electrolytic layer, a catalyst layer, and a conductive layer successively formed on the transparent substrate; second photoelectric conversion elements each having a transparent conductive layer, a catalyst layer, an electrolytic layer, a porous photoelectric conversion layer adsorbing a dye, and a conductive layer successively formed on the transparent substrate; supporting substrates formed on the respective conductive layers of the first and second photoelectric conversion elements, wherein one or more first photoelectric conversion elements and one or more second photoelectric conversion elements are alternately arranged in parallel between the transparent substrate and the supporting substrate and the respective elements of one or more first photoelectric conversion elements and one or more second photoelectric conversion elements differ from each other.

Effects of the Invention

In the dye-sensitized solar cell module of the present invention, since constituent factors of the respective photoelectric conversion elements (the layering order of the respective layers composing the respective photoelectric conversion elements; the type and the composition of the materials of the respective layers; the particle diameter in the case the materials of the respective layers are granular; the thickness and the width of the respective layers; the form of the respective layers; and the open circuit voltage of the respective photoelectric conversion elements), to say more practically, at least one among the above-mentioned constituent factors in the first and second photoelectric conversion elements is made different, so that the properties such as the photoelectric conversion efficiency and the electric current can be improved as compared with a conventional technique.

BRIEF DESCRIPTION OF THE DRAWINGS

FIG. 2 is an explanatory drawing of a production method of the solar cell module shown in FIG. 1

BEST MODE FOR CARRYING OUT THE INVENTION

A dye-sensitized solar cell (hereinafter, sometimes referred to simply as a solar cell) of an embodiment of the present invention comprises first photoelectric conversion elements each comprising a transparent substrate in the light receiving face side and a transparent conductive layer, a porous photoelectric conversion layer adsorbing a dye, an electrolytic layer, a catalyst layer, and a conductive layer successively formed on the transparent substrate; second photoelectric conversion elements each comprising a transparent conductive layer, a catalyst layer, an electrolytic layer, a porous photoelectric conversion layer adsorbing a dye, and a conductive layer successively formed on the above-mentioned transparent substrate; supporting substrates formed on the respective conductive layers of the first and second photoelectric conversion elements, wherein one or more first photoelectric conversion elements and one or more second photoelectric conversion elements are alternately arranged in parallel between the transparent substrate and the supporting substrate and they are electrically connected in series, and further the respective elements of one or more first photoelectric conversion elements and one or more second photoelectric conversion elements differ from one another.

Herein, that at least the first photoelectric conversion elements and the second photoelectric conversion elements are different is defined as to include the cases that the first photoelectric conversion elements themselves are different one another and/or the second photoelectric conversion elements themselves are different one another. Practical constituent factors differing in the first photoelectric conversion elements and the second photoelectric conversion elements include the composition of the electrolytic layers, the film thickness of the porous photoelectric conversion layers, the width of the porous photoelectric conversion layers; the dye adsorbed in the photoelectric conversion layers; and the average particle diameter of the semiconductor particles composing the porous photoelectric conversion layers. The dye-sensitized solar cell module of the present invention is characterized in that at least any one of these constituent factors differ in at least the first photoelectric conversion elements and the second photoelectric conversion elements, or two or more factors may differ.

Figure 1:
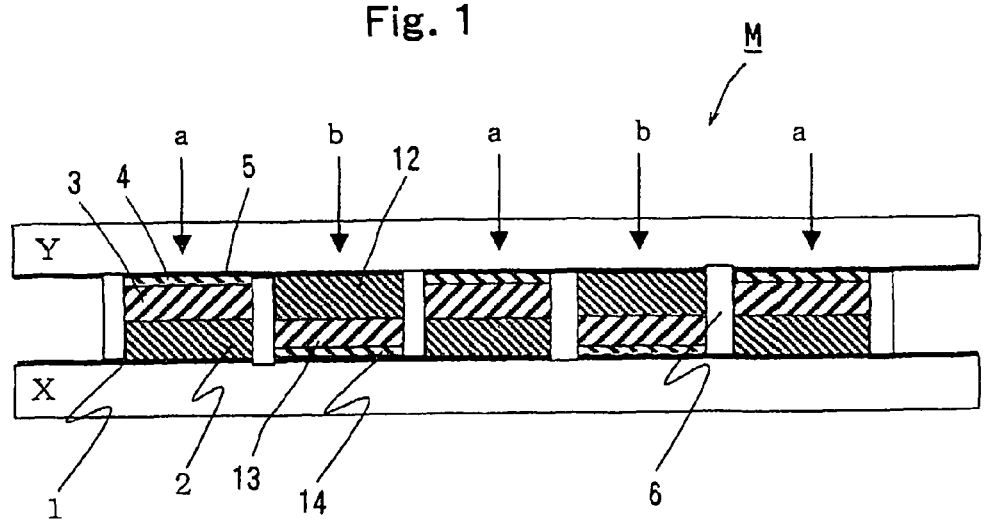
FIG. 1 is a schematic cross-sectional view showing one row portion of an integrated dye-sensitized solar cell module of the present invention.

Next, the basic structure of the dye-sensitized solar cell module of the present invention will be described more practically with reference to FIG. 1. FIG. 1 is a schematic cross-sectional view showing one row portion of an integrated dye-sensitized solar cell module of the present invention.

The solar cell module (one row portion) M comprises a transparent insulating substrate X in the light receiving face side, a supporting substrate Y in the rear face (non-light receiving face) side, three first photoelectric conversion elements (a) installed between these substrates X and Y, two second photoelectric conversion elements (b) installed adjacent between the respective first photoelectric conversion elements (a) and (a).

Each first photoelectric conversion element (a) comprises a transparent conductive layer 1, a porous photoelectric conversion layer 2, an electrolytic layer 3, a catalyst layer 4, and a conductive layer 5 successively formed in this order from a transparent insulating substrate X side. Each second photoelectric conversion element (b) comprises a transparent conductive layer 1, a catalyst layer 14, an electrolytic layer 13, a porous photoelectric conversion layer 12, and a conductive layer 5 successively formed in this order from the transparent insulating substrate X side. Further, the five first and second photoelectric conversion elements (a) and (b) are electrically connected in series by their transparent conductive layers 1 and conductive layers 5 and the gaps between neighboring cells and the outer circumferential parts of the cells are filled and sealed with an insulating layer 6 (e.g. an insulating resin).

Hereinafter, in this specification, "a solar cell unit" or "a unit cell" means the structure composed by sandwiching the above-mentioned first photoelectric conversion elements and second photoelectric conversion elements with a transparent insulating substrate and a supporting substrate.

Figure 2A:
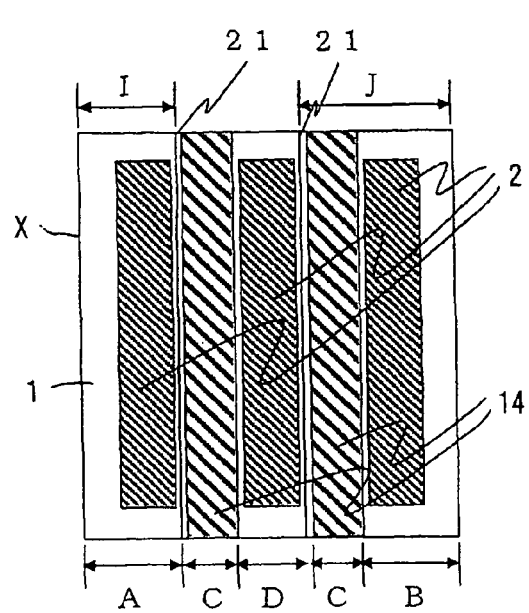
FIG. 2A is a schematic plain view showing the film formation state in the transparent insulating substrate X side and FIG. 2B is a schematic plain view showing the film formation state in the supporting substrate Y side.
Figure 2B:
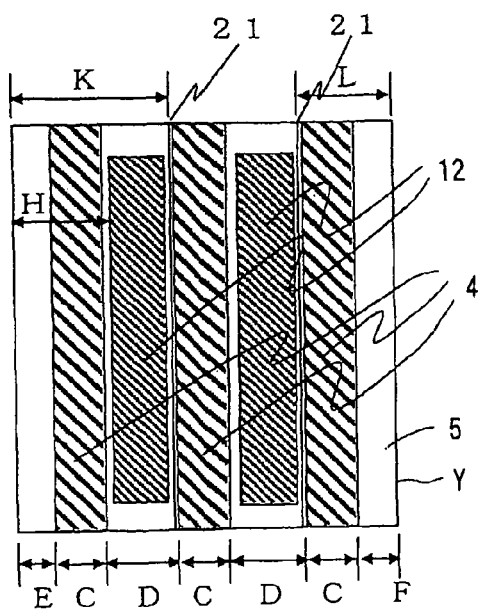

FIG. 2 is an explanatory drawing of a production method of the solar cell module shown in FIG. 1 and FIG. 2A is a schematic plain view showing the film formation state in the transparent insulating substrate X side and FIG. 2B is a schematic plain view showing the film formation state in the supporting substrate Y side. The solar cell module of this embodiment can be produced as follows.

A transparent conductive layer 1 is formed on almost entire face of one surface of the transparent insulating substrate X and strip-like porous photoelectric conversion layers 2 and catalyst layers 14 are formed alternately at intervals thereon. The transparent conductive layer 1 between the prescribed porous photoelectric conversion layers 2 and catalyst layers 14 is scribed with laser. On the other hand, a conductive layer 5 is formed on almost entire face of one surface of a supporting substrate Y and strip-like catalyst layers 4 and porous photoelectric conversion layers 12 are formed alternately at intervals thereon. Then, the conductive layer 5 between the prescribed catalyst layers 4 and the porous photoelectric conversion layers 12 is scribed. Next, while the porous photoelectric conversion layers 2 and the catalyst layers 4 are set face to face and the catalyst layers 4 and the porous photoelectric conversion layers 2 are set face to face on the transparent insulating substrate X and the supporting substrate Y, an insulating adhesive is inserted between respective cells and the substrates X and Y are overlapped and stuck to each other. After that, an electrolytic solution is injected between the respective catalyst layers 4 and 14 and the respective porous photoelectric conversion layers to form first and second photoelectric conversion elements (a) and (b) and outer circumferences of the cells are sealed with an insulating resin to obtain a solar cell module M. Further practical production steps will be described later.

Hereinafter, the respective constituent components of a dye-sensitized solar cell of the present invention will be described.

[Transparent Substrate and Supporting Substrate]

Those usable as a material of a transparent substrate composing a light receiving face of a solar cell are, for example, a transparent glass substrate of such as soda glass, fused quartz glass, and crystalline quartz glass; a flexible film of heat resistant transparent resins; and a metal sheet. The transparent substrate is preferably those having a thickness of 0.2 to 5 mm and heat resistance to a temperature of 250° C. or higher.

Usable films as the flexible film (hereinafter, referred to as a film for short) are long term weathering resistant sheets and films of, for example, polyesters, acrylic polymers, polyimide, Teflon®, polyethylene, polypropylene, and PET. Among them is preferably Teflon® having heat resistance to a temperature of 250° C. or higher since the transparent substrate is heated at that temperature at the time of transparent conductive layer formation.

Further, as a material for the supporting substrate composing the non-light receiving face of the solar cell is not limited in the transparent property but those same as the materials for the transparent substrate and others such as metal sheets can be used. Since metal sheets are scant in transparent property, they are preferable to be used as a supporting substrate in the non-light receiving face side. Some of the metal sheets are sometimes corroded with a material to be used for the electrolytic layer, so that it is preferable to coat the contact portion of the metal sheet surface brought into contact with the electrolytic layer with a material having high corrosion resistance such as a metal oxide.

These transparent substrate and supporting substrate may be utilized for installation of a completed dye-sensitized solar cell to another structure body. That is, in the case a substrate of glass is used, the peripheral part of the glass substrate is easily attached to another support by metal processing parts and screws.

[Transparent Conductive Layer and Conductive Layer]

As a material for a transparent conductive layer in the light receiving face side, those which practically transmit light rays with wavelength actually effective to activate a sensitizing dye to be described later may be used and it is not necessarily required to use materials which transmit light rays in all wavelength regions. Examples usable as the material may include transparent conductive metal oxides such as ITO (indium-tin compounded oxide), IZO (indium-zinc compounded oxide), tin oxide doped with fluorine, zinc oxide doped with boron, gallium, or aluminum, and titanium oxide doped with niobium or thin films of opaque materials such as gold, silver, aluminum, indium, platinum, and carbon (e.g. carbon black, graphite, glassy carbon, amorphous carbon, hard carbon, soft carbon, carbon-whisker, carbon nano-tube, and fullerene). In this connection, in the case metal materials are used, since some are corroded with the electrolytic solution, the portions of the materials to be brought into contact with the electrolytic solution may be coated with a material resistant to corrosion.

Materials same as those for the transparent conductive layer may be used for the materials of the conductive layer in the non-light receiving face side. In this connection, although the conductive layer is not particularly limited in the possession of transparent property, in the case of using an opaque material, it can be omitted to make the layer thin. Further, in the case the electrolytic layer contains iodine, the materials are preferable to be iodine-resistant materials.

These transparent conductive layer and conductive layer may be formed by conventional techniques such as a PVD method, an evaporation method, a sputtering method, a coating method and the like.

[Catalyst Layer]

Materials to be used for the catalyst layer may be those which can activate the redox reaction of the electrolytic layer to be described later and examples are platinum, platinum chloride, carbon (e.g. carbon black, graphite, glassy carbon, amorphous carbon, hard carbon, soft carbon, carbon whisker, carbon nano-tube, and fullerene) and platinum is preferable among them. However, since the catalyst layer in the light receiving face side of the dye-sensitized solar cell module, that is, the catalyst layer in the second photoelectric conversion element, is required to have transparent property just like the conductive layer, it is required to make the layer thin. Although the thickness of the layer differs depending on the catalyst material, in the case of using platinum, it is preferably 0.5 to 300 nm and more preferably 1 to 30 nm. The catalyst layer can be formed by conventional techniques such as a PVD method, an evaporation method, a sputtering method, a coating method and the like.

To increase the transmittance of the catalyst layer, it is preferable for the layer to have an aperture part in terms of the transmittance. Herein, the aperture part means a region of the conductive layer which is not covered with the catalyst layer.

The form of the catalyst layer is not particularly limited and may be stripes, a lattice-like form, and dots.

In the case the catalyst layer is in stripes, the porosity P of the catalyst layer defined as the following equation (1) is preferably 0.4 or higher and more preferably 0.8 or higher and 0.95 or lower:

$$P = L1/(L1+W) \qquad [\text{Equation 1}]$$

wherein L1 denotes the intervals of the stripes and W denotes the width of stripe lines of the catalyst layer. In this connection, if P is lower than 0.4, the transmitted light quantity is decreased and Jsc is therefore decreased and if it is higher than 0.95, the catalytic function is decreased and the redox reaction cannot be carried out smoothly to result in decrease of FF.

In this case, W is preferably 1 mm or narrower and more preferably 0.2 mm or narrower.

In the case the catalyst layer is like a lattice and the lattice is a parallelogram, rhomboid, rectangle, or regular square, P defined as the following equation (2) is preferably 0.4 or higher and more preferably in a range from 0.8 to 0.95:

$$P = \frac{(L1 - W/\sin\theta)(L2 - W/\sin\theta)}{L1 L2} \qquad [\text{Equation 2}]$$

wherein L1 and L2 respectively denote one side length; W denotes the line width of the lattice of the catalyst layer; and θ denotes an angle between two lines. If the above-mentioned A is lower than 0.4, the transmitted light quantity is decreased and Jsc is therefore decreased and if it is higher than 0.95, the catalytic function is decreased and the redox reaction cannot be carried out smoothly to result in decrease of FF.

In this case, W is preferably 0.5 mm or narrower and more preferably 0.1 mm or narrower.

In the case the catalyst layer is formed in dots, although the light transmittance is desirable to almost 100%, it may be 70 to 80%. If the light transmittance is in the range, the shape and the size of the dots are not particularly limited and may be selected properly and optionally from forms such as circular, elliptical, polygonal and irregular forms, however it is preferable that the dots are dispersed evenly.

[Porous Photoelectric Conversion Layer]

The photoelectric conversion layer contains a semiconductor and it may be granular having a large number of fine voids in the surface and inside or in form of a film or in other structures, however the layer is preferable to be in form of a film. The material composing the porous photoelectric conversion layer may be one or more kinds of conventionally known semiconductors such as titanium oxide, zinc oxide, tungsten oxide, barium titanate, strontium titanate, and cadmium sulfide. Among them is titanium oxide preferable in terms of photoelectric conversion efficiency, stability, and safety.

A variety of conventionally known methods can be employed as the method for forming the film-like porous photoelectric conversion layer on a substrate. Practical examples of the method to be employed may include a method applying a paste containing semiconductor particles to a substrate by screen printing method or an ink-jet method and then firing the paste; a method for forming a film on a substrate by a CVD method or a MOCVD method using desired raw material gases; a PVD method, a evaporation method, a sputtering method, or a sol-gel method using solid raw materials; and a method employing electrochemical redox reaction. Among these methods, in terms of thick film formation and product cost, the screen printing method using a paste is preferable. At the time of printing the porous photoelectric conversion layer by screen printing, to lessen the drip after printing, the printing may be carried out separately several times. Further, in the case of carrying out the printing separately several times, pastes containing different materials and fine particles with different particle diameters may be used for printing.

Although the thickness of the porous photoelectric conversion layer is not particularly limited, however it is preferable in a range from 0.5 to 50 μm in terms of the photoelectric conversion efficiency. Further, to improve the photoelectric conversion efficiency, it is required to adsorb a larger quantity of a sensitizing dye, which will be described later, in the porous photoelectric conversion layer. Therefore, the film-like porous photoelectric conversion layer is preferable to have a large specific surface area and the specific surface area is preferably in a range from about 10 to 500 $m^2/g$ and more preferably in a range from about 10 to 200 $m^2/g$. In this invention, the specific surface area means a value measured by BET adsorption method.

Examples as the above-mentioned semiconductor particles may be particles of simple substances or compound semiconductors having a proper average particle diameter, for example, 1 to 500 nm, among commercialized ones. Also, a single porous photoelectric conversion layer may contain semiconductor fine particles with different particle diameters. As an evaluation method for particle diameter of the semiconductor particles may be exemplified a method of observing the particles by a scanning electron microscope (SEM) and a transmission electron microscope (TEM) and a method for calculation of the particle diameter from the half width of the x-ray diffractive spectrum. In this invention, the half width of the peak at a diffraction angle of 25.28° (corresponding to 101 plane of anatase) in θ/2θ measurement by an x-ray diffraction apparatus is measured and the particle diameter obtained from the measured value and Scherrer equation is employed as the average particle diameter.

The average particle diameter of the semiconductor particles composing the porous photoelectric conversion layer in the light receiving face side is preferable 30 nm or smaller and more preferably 20 nm or smaller and 8 nm or larger since the connection of the porous photoelectric conversion layer and the transparent conductive layer is made well and the leakage current from the transparent conductive layer to the electrolytic layer can be decreased to result in increase of the open circuit voltage. If the particles composing the porous photoelectric conversion layer become too small, the ratio of increase of the dye adsorption amount to the ratio of increase of the surface area of the particles considerably becomes low. That is, the particle surface area where no dye is adsorbed is increased and the contact portion of the particle surface and the electrolytic substance is increased and therefore the reverse reaction from the particles to the electrolytic substance becomes significant to lower the power.

On the other hand, it is preferable to contain semiconductor particles with 100 nm size or higher and more preferable to contain semiconductor particles with a size of 200 to 1000 nm since the conversion efficiency can be improved more by increasing the short circuit current same as or more than the open circuit voltage in the case the porous photoelectric conversion layer in the non-light receiving face side contains semiconductor particles with a large particle diameter having light scattering property together than in the case the layer contains semiconductor particles with a small particle diameter alone. Additionally, if the particle size exceeds 1000 nm, in addition to decrease of the effect to scatter the light in a visible light region, the connection of the porous photoelectric conversion layer and the conductive layer is considerably deteriorated and the open circuit voltage is decreased same as or more than the short circuit current is improved and therefore it is not preferable.

The porous semiconductor layer in the non-light receiving face side may be composed of a plurality of layers containing semiconductor particles having different particle diameters. In this case, it is preferable that the layer nearest to the supporting substrate in the non-light receiving face side contains semiconductor particles with a particle diameter of 100 nm or larger since the short circuit current in the porous photoelectric conversion layer in the non-light receiving face side is improved. Further, it is more preferable that the layer contains semiconductor particles with a particle diameter of 200 to 1000 nm since the visible light scattering is intensified and the short circuit current is more improved. In this case, it is preferable that the semiconductor particles contained in the layer furthest to the supporting substrate in the non-light receiving face side among a plurality of layers composing the porous semiconductor layer are smaller than the average particle diameter of the semiconductor particles composing the layer nearest to the supporting substrate since the electron transporting function in the porous photoelectric conversion layer is improved. The particle diameter is preferably 30 nm or smaller and more preferably 20 nm or smaller.

For example, in the case titanium oxide is used for semiconductor particles, the particles can be produced as follows.

A sol solution is produced by dropwise adding 125 ml of titanium isopropoxide (manufactured by Kishida Chemical Co., Ltd.) to 750 ml of an aqueous 0.1 M nitric acid solution (manufactured by Kishida Chemical Co., Ltd.), hydrolyzing the titanium isopropoxide, and heating the resulting solution at 80° C. for 8 hours. After that, the obtained product is autoclaved at 230° C. for 11 hours in an autoclave made of titanium to grow particles and the particles are dispersed by ultrasonic dispersion for 30 minutes to obtain a colloidal solution containing titanium oxide particles with an average primary particle diameter of 15 nm and successively, ethanol in a volume two times as much is added to the solution and the mixture is centrifuged at 5000 rpm to produce titanium oxide particles.

A solvent to be used for producing a paste by suspending these semiconductor particles therein may be glyme solvents such as ethylene glycol monoethyl ether; alcohol type solvents such as isopropyl alcohol; mixed solvents such as isopropyl alcohol/toluene; and water. Practically, a paste is produced by the following steps.

After the titanium oxide particles produced in the above-mentioned process are washed, a solution obtained by dissolving ethyl cellulose (manufactured by Kishida Chemical Co., Ltd.) and terpineol (manufactured by Kishida Chemical Co., Ltd.) in absolute ethanol is added and stirred to disperse the titanium oxide particles. After that, under 30 Torr vacuum, ethanol is evaporated at 50° C. to obtain a titanium oxide paste. In this connection, the concentration is controlled so as to adjust the titanium oxide solid concentration to be 20% by weight, ethyl cellulose concentration to be 10% by weight, and terpineol concentration to be 64% by weight as the final composition.

The drying and firing of the above-mentioned porous photoelectric conversion layer is carried out while the conditions such as temperature, time, ambient air or the like are properly adjusted in accordance with the substrate to be used and the type of the semiconductor particles. The condition may be exemplified as a temperature in a range of 50 to 800° C. for a period of 10 seconds to 12 hours under atmospheric air. The drying and firing can be carried out once at a constant temperature or twice or more times at different temperatures.

[Photosensitizing Dye]

As a dye adsorbed in the porous photoelectric conversion layer and functioning as a photosensitizing dye, various types of dyes having light absorption in a visible light region and/or an infrared ray region can be exemplified. Further, the dye to be firmly adsorbed in the porous photoelectric conversion layer, those having interlocking groups such as a carboxylic acid group, a carboxylic acid anhydride group, an alkoxy group, a hydroxyl group, a hydroxyalkyl group, a sulfonic acid group, an ester group, a mercapto group, and a phosphonyl group (particularly lower groups having 1 to 3 carbon atoms) are preferable. Among them, a carboxylic acid group and a carboxylic acid anhydride group are more preferable. The interlocking group provides electric bond for making the electron transfer between the excitation state of the dye and the conduction band of the porous photoelectric conversion layer easy.

Examples of the dyes having such interlocking groups are ruthenium metal complex dyes, azo type dyes, quinone type dyes, quinoneimine type dyes, quinacridone type dyes, squarylium type dyes, cyanine type dyes, merocyanine type dyes, triphenylmethane type dyes, xanthene type dyes, porphyrin type dyes, phthalocyanine type dyes, perylene type dyes, indigo type dyes, and naphthalocyanine type dyes.

A method for adsorbing the dye in the porous photoelectric conversion layer may be a method of immersing a porous photoelectric conversion layer formed on a substrate via a transparent conductive layer or a conductive layer in a solution (a solution for dye adsorption) containing a dye dissolved therein. In this case, the adsorption may be carried out under a room temperature or in a condition of heating by a refluxing method to improve the adsorption speed.

A solvent to dissolve the dye therein may include any solvent which can dissolve the dye and practical examples are alcohols such as ethanol and methanol; ketones such as acetone and diethyl ketone; ethers such as diethyl ether and tetrahydrofuran; nitrile compounds such as acetonitrile and benzonitrile; aliphatic haloganated hydrocarbons such as chloroform and methyl chloride; aliphatic hydrocarbons such as hexane and pentane; aromatic hydrocarbons such as benzene and toluene; esters such as ethyl acetate and methyl acetate; and water. These solvents may be used alone or two or more of them may be used in form of a mixture.

The dye concentration in the solution can be adjusted property depending on the types of the dye and solvent to be used, however it is more preferable as it is a higher concentration to improve the adsorption capability and it may be $1 \times 10^{-4}$ to $5 \times 10^{-4}$ mole/l or higher.

[Electrolytic Layer]

The electrolytic layer inserted between the porous photoelectric conversion layer and the catalyst layer may contain a liquid electrolytic substance and a solid electrolytic substance. The liquid electrolytic substance may include those which are in liquid state and contain redox seeds. Practical examples are mixtures of the redox seeds and solvents capable of dissolving the seeds; mixture of the redox seeds and molten salts capable of dissolving the seeds; and mixtures of the redox seeds and solvents and molten salts capable of dissolving the seeds and those which can be used generally for batteries and solar cells may be used without any particular limit. The solid electrolytic substance may include conductive materials capable of transporting electrons, holes, and ion, usable as an electrolytic substance for a solar cell, and having no fluidity. Practical examples are hole transporting materials such as polycarbazole; electron transporting materials such as tetranitrofluorenone; conductive polymers such as polypyrrole and polythiophene; high molecular weight electrolytic polymer obtained by solidifying liquid electrolytic substances with a polymer compound; p-type semiconductors such as copper iodide and copper thiocyanate; and electrolytic substances obtained by solidifying liquid electrolytic substances including molten salt with fine particles.

Examples of the electrolytic substance may include combinations of $I_2$ with iodides include metal iodides such as LiI, NaI, KI, CsI, and $CaI_2$ and iodide salts of quaternary ammonium compounds such as tetraalkylammonium iodide, pyridinium iodide, and imidazolium iodide; combinations of $Br_2$ with bromide include metal bromides such as LiBr, NaBr, KBr, CsBr, and $CaBr_2$ and bromide salts of quaternary ammonium compounds such as tetraalkylammonium bromide, and pyridinium bromide; metal complexes such as ferrocyanate-ferricyanate, ferrocene-ferricinium ion; sulfur compounds such as sodium polysulfide, alkylthiol-alkyldisulfide; viologen dyes and hydroquinone-quinone. Among them, combinations of LiI, pyridinium iodide, and imidazolium iodide with $I_2$ are preferable in terms of improvement of open circuit voltage. Two or more kinds of the above-mentioned electrolytic substances may be used in form of a mixture.

Further, imidazolium salts such as 1,2-dimethyl-3-propylimidazole iodide (hereinafter abbreviated as DMPII), ethylimidazole iodide (hereinafter abbreviated as EII), 1-ethyl-3-methylimidazole iodide (hereinafter abbreviated as EMII), 1-methyl-3-propylimidazole iodide (hereinafter abbreviated as MPII), 1-butyl-3-methylimidazole iodide (hereinafter abbreviated as BMII), and 1,2-dimethyl-3-hexylimidazole iodide (hereinafter abbreviated as DMHII) may be added and MPII is preferable among them.

Examples usable as a solvent for the electrolytic layer are carbonate compounds such as ethylene carbonate, propylene carbonate; heterocyclic compounds such as 3-methyl-2-oxazolidinone; ether compounds such as dioxygenase and diethyl ether; ethers such as ethylene glycol dialkyl ether, propylene glycol dialkyl ether, polyethylene glycol dialkyl ether, polypropylene glycol dialkyl ether, ethylene glycol monoalkyl ether, propylene glycol monoalkyl ether, polyethylene glycol monoalkyl ether, and polypropylene glycol monoalkyl ether; alcohols such as methanol and ethanol; polyhydric alcohols such as ethylene glycol, propylene glycol, polyethylene glycol, polypropylene glycol, and glycerin; nitrile compounds such as acetonitrile, glutarodinitrile, methoxyacetonitrile, propionitrile, and benzonitrile; non-protonic polar substances such as dimethyl sulfoxide and sulfolane; and water. Among them are carbonate compounds and nitrile compounds preferable. These solvents may be used alone or two or more of them may be used in form of a mixture.

As the gel electrolytic substance can be used those which are produced by using an electrolytic substance and a gelling agent.

Polymer gelling agents are preferably usable as the gelling agent. Examples usable as the gelling agent are cross-linked polyacrylic resin derivatives and cross-linked polyacrylonitrile derivatives; polyalkylene oxide derivatives; silicone resins; and polymers having nitrogen-containing heterocyclic quaternary compound salt structure in the side chains.

As the molten salt gel electrolytic substance can be used those which are obtained by adding a normal temperature molten salt to a gel electrolytic materials. The normal temperature molten salt may include nitrogen-containing heterocyclic quaternary ammonium compounds such as pyridinium salts and imidazolinium salts.

The electrolytic substance concentration may be selected in accordance with the various electrolytic substances and is preferably in a range from 0.005 to 1.5 mole/l . However, in the case the catalyst layer is in the light receiving face side of the dye-sensitized solar cell module of the present invention, the light coming in reaches a porous photoelectric conversion layer adsorbing the dye through the electrolytic solution to excite a carrier. Therefore, the power may possibly be decreased in accordance with the concentration of the electrolytic substance to be used for the second photoelectric conversion element in which the catalyst layer exists in the light receiving face side.

The present invention is so composed as to exhibit the solar cell properties to the maximum based on the correlation of the electrolytic substance concentration with the first photoelectric conversion element in which the porous photoelectric conversion layer exists in the light receiving face side and the second photoelectric conversion element in which the catalyst layer exists in the light receiving face side.

Embodiment 1

A dye-sensitized solar cell of Embodiment 1 is characterized in that first photoelectric conversion elements (a) and second photoelectric conversion elements (b) have different compositions of electrolytic layers 3 and 13.

Practically the compositions of the electrolytic layers 3 and 13 of the first photoelectric conversion elements (a) and the second photoelectric conversion elements (b) are made different as described (1) to (5) below.

(1) The first photoelectric conversion elements (a) and the second photoelectric conversion elements (b) contain iodine in the respective electrolytic layers 3 and 13 and the iodine concentration in the electrolytic layers 13 of the second photoelectric conversion elements (b) is lower than the iodine concentration in the electrolytic layers of the first photoelectric conversion elements (a).

With such a constitution, the electric current of respective unit cells of the first photoelectric conversion layers and the second photoelectric conversion layers of the solar cell module can efficiently be extracted.

(2) The ratio M1/M2 of the iodine concentration M1 in the electrolytic layers 3 of the first photoelectric conversion elements (a) and the iodine concentration M2 of the electrolytic layers 13 in the second photoelectric conversion elements (b) is in a range from 0.5 or higher and 10 or lower, more preferably in a range from 1 or higher and 5 or lower.

With such a constitution, the power of respective unit cells of the solar cell module can efficiently be extracted. In this connection if the ratio M1/M2 is higher than 5 or lower than 1, the power of the first photoelectric conversion elements and the second photoelectric conversion elements may be decreased.

(3) In one or more first photoelectric conversion elements and one or more second photoelectric conversion elements, an imidazolium salt is contained in respective elements.

With such a constitution, better solar cell properties can be obtained than those in the case no imidazolium salt is contained.

(4) The imidazolium salt is a salt of a compound defined by the following formula (I)

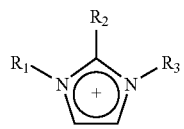

(I)

wherein $R_1$ and $R_2$ independently denote a hydrogen atom or methyl; $R_3$ denotes methyl, ethyl, propyl, butyl, or hexyl. In the formula, it is preferable that $R_1$ and $R_2$ independently denote a hydrogen and $R_3$ denotes methyl.

(5) The respective electrolytic layers 3 and 13 of the first photoelectric conversion elements (a) and the second photoelectric conversion elements (b) contain different imidazolium salts.

With such a constitution, desirable solar cell properties can be obtained.

Herein, the property changes in relation to the electrolytic substance concentration of the dye-sensitized solar cell module are confirmed.

First to confirm the property changes depending on the electrolytic solution composition, a solar cell unit (hereinafter, simply referred to as unit cell in some cases) is produced.

A substrate is produced by forming a 900 nm-thick film of $SnO_2$ as a transparent conductive layer on one face of a glass substrate with a size of 10 mm width×50 mm length×1.1 mm thickness and a titanium oxide paste (trade name: D/SP; manufactured by Solaronix) is applied in a form as to give a shape of 5 mm width×40 mm length×12 μm thickness after firing to the transparent conductive layer by a screen printing apparatus (LS-150, manufactured by Newlong Seimitsu Kogyo Co., Ltd.), leveled at a room temperature for 1 hour and successively dried at 80° C. in an oven. After that, the paste is fired at 500° C. in air to form a porous photoelectric conversion layer on the substrate via the transparent conductive film. Next, a ruthenium dye (trade name: Ruthenium 620 1H3TBA, manufactured by Solaronix) defined by the following formula (II) is dissolved in a concentration of $4\times10^{-4}$ mole/l in a solvent mixture of acetonitrile and tert-butanol mixed at 1:1 by volume and further, deoxycholic acid (DCA, manufactured by Aldrich) is dissolved in a concentration of $1\times10^{-2}$ mole/l to produce a dye solution for adsorption and the porous photoelectric conversion layer on the substrate is immersed in the dye solution for adsorption to adsorb the dye in the porous photoelectric conversion layer. Four substrates having the porous photoelectric conversion layer adsorbing the dye are produced.

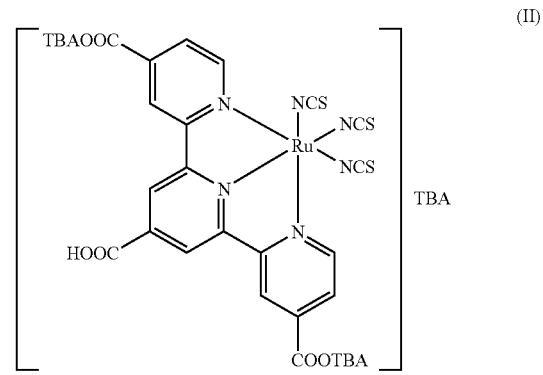

(II)

On the other hand, other glass substrates each forming a $SnO_2$ film are prepared and four substrates are produced by forming a film of platinum in a thickness of about 5 nm as a catalyst layer by sputtering method on the $SnO_2$ of the substrates. After that, the substrates having the porous photoelectric conversion layer and the substrates having the catalyst layer are set on the opposite to each other and layered in a manner that the porous photoelectric conversion layer adsorbing the dye and the catalyst layer are set face to face and an electrolytic solution is poured between the porous photoelectric conversion layer and the catalyst layer to produce a solar cell unit. In this connection, the catalyst layer and the porous photoelectric conversion layer adsorbing the dye are kept from each other by inserting a separator (trade name: Himilan, 30 μm, manufactured by Du Pont) between the catalyst layer and the porous photoelectric conversion layer.

As the electrolytic solution are produced four kinds of electrolytic solutions by using an acetonitrile as a solvent and dissolving 0.6 mole/l of DMPII as an imidazolium salt; 0.1 mole/l of lithium iodine (hereinafter, referred to as LiI for short), 0.5 mole/l of tert-butylpyridine (hereinafter, referred to as TBP for short), and iodine (hereinafter, referred to as $I_2$) to be adjusted the concentration of 0.01 mole/l, 0.02 mole/l, 0.03 mole/l, and 0.05 mole/l, respectively.

Four kind solar cell units produced by using the above-mentioned four kinds of the electrolytic solutions are subjected to solar cell measurement. The measurement is carried out by radiating light to the porous photoelectric conversion layer and the catalyst layer of each cell unit. The results in the case the light radiating face is set in the porous photoelectric conversion layer side are shown in Table 1 and the results in the case the light radiating face is set in the catalyst layer side are shown in Table 2.

TABLE 1

(Light receiving face: porous photoelectric conversion layer side)

| | Iodine concentration (mole/l) | | | |
|---|---|---|---|---|
| | 0.01 | 0.02 | 0.03 | 0.05 |
| Short circuit current density (mA/cm$^2$) | 15.1 | 15.7 | 15.7 | 15.3 |
| Open circuit voltage value (V) | 0.66 | 0.66 | 0.67 | 0.65 |
| FF | 0.65 | 0.65 | 0.65 | 0.67 |
| Conversion efficiency (%) | 6.5 | 6.7 | 6.8 | 6.7 |

TABLE 2

(Light receiving face: catalyst layer side)

| | Iodine concentration (mole/l) | | | |
|---|---|---|---|---|
| | 0.01 | 0.02 | 0.03 | 0.05 |
| Short circuit current density (mA/cm$^2$) | 13.0 | 14.9 | 12.9 | 9.2 |
| Open circuit voltage value (V) | 0.63 | 0.62 | 0.63 | 0.63 |
| FF | 0.68 | 0.67 | 0.69 | 0.70 |
| Conversion efficiency (%) | 5.6 | 6.2 | 5.6 | 4.1 |

As being understood from the results shown in Table 1 and Table 2, in the case the light receiving face is set in the porous photoelectric conversion layer side, no significant difference is observed even if the iodine concentration of the electrolytic solution is changed, whereas in the case the light receiving face is set in the catalyst layer side, the values of the respective properties are found significantly fluctuated. It is also found that the short circuit current density value with the iodine concentration of 0.05 mole/l in the case the light receiving face is set in the porous photoelectric conversion layer side is almost the same as the short circuit current density value with the iodine concentration of 0.02 mole/l in the case the light receiving face is set in the catalyst layer side. It is supposed that in the case the light receiving face is set in the catalyst layer side, the light transmitted through the electrolytic solution part reaches the porous photoelectric conversion layer adsorbing the dye and excites the carrier and therefore, the properties are considerably fluctuated in accordance with the fluctuation of the iodine concentration.

Figure 3:
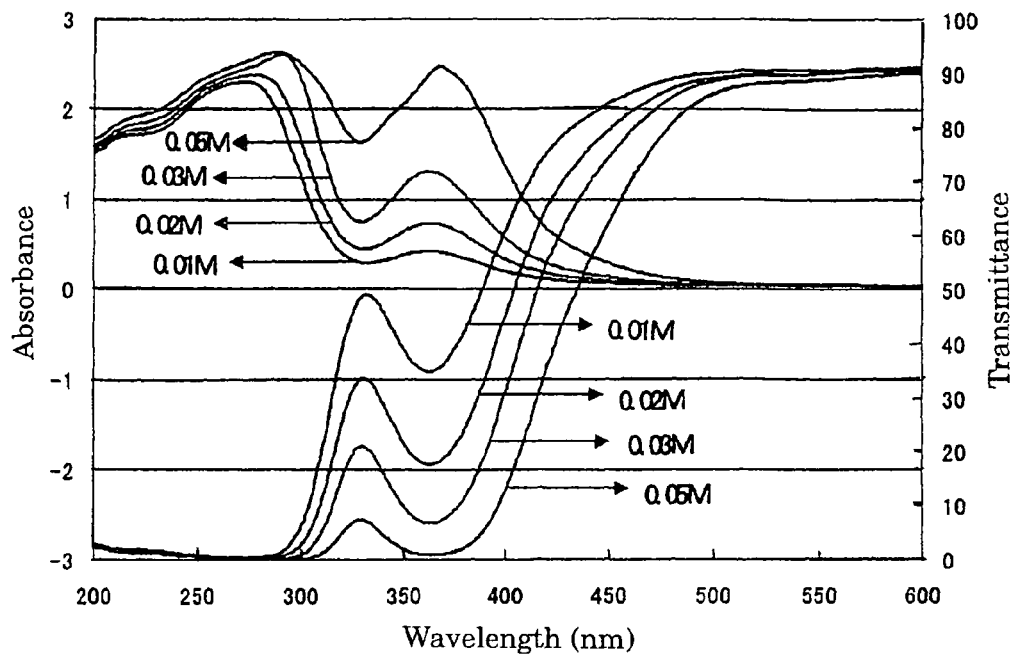
FIG. 3 is a graph showing the correlation of the transmittance and absorbance of an electrolytic solution to be used in the dye-sensitized solar cell module of the present invention with the wavelength.

Next, the light transmittance and absorbance of the above-mentioned four electrolytic solutions are measured and the results are shown in FIG. 3. At the time of measurement, four sets of glass substrates (25 mm width×40 mm length×1.0 mm thickness) sandwiching a 30 μm-thick separator are made ready and the four kind electrolytic solutions are injected between the substrates of the four sets to produce four kind cells for measurement and then the measurement is carried out. As a result of the measurement, with respect to the light with wavelength about 300 to 550 nm, the transmittance and the absorbance are considerably fluctuated in accordance with the iodine concentration and it is understood that the fluctuation is particularly significant in the case the light receiving face is set in the catalyst layer side in an actual dye-sensitized solar cell. Corresponding to the fluctuation of them, the short circuit current density is affected significantly in the case the light receiving face is set in the catalyst layer side (reference to Table 1 and Table 2).

In the case the above-mentioned solar cell units are used to produce dye-sensitized solar cell module with a conventional structure, the electrolytic solution concentration is the same in the respective electrolytic layers of the cell units in which the light receiving face is set the porous photoelectric conversion layer side and of the cell units in which the light receiving face is set in the catalyst layer side. In this case, from the experiment results of Table 1 and Table 2, if the iodine concentration is 0.05 mole/l, the short circuit current value of the cell units in which the light receiving face is set in the porous photoelectric conversion layer side is expected to be about 49.0 mA and the short circuit current value of the cell units in which the light receiving face is set in the catalyst layer side is expected to be about 29.4 mA. Accordingly, in the case a series connection type dye-sensitized solar cell module is produced, the electric current of the module is not the current value 49.0 mA of the cell units in which the light receiving face is set in the porous photoelectric conversion layer side and thus the short circuit current of the cell units in which the light receiving face is set in the porous photoelectric conversion layer side cannot advantageously be utilized.

On the other hand, in the present invention, in the case the iodine concentration is controlled to be 0.05 mole/l and 0.02 mole/l in the cell units in which the light receiving face is set in the porous photoelectric conversion layer side and in the catalyst layer side, respectively, the difference of the short circuit current value of the respective cell units is about 1 mA or lower and approximately the same output can be obtained. Accordingly, a higher output power can be obtained in the case of a dye-sensitized solar cell module which comprises a plurality of solar cell units each comprising a conductive layer, a porous photoelectric conversion layer adsorbing a dye, an electrolytic layer, a catalyst layer, and a conductively layer successively layered between substrates and which is produced by alternately and reversely arranging the porous photoelectric conversion layers and the catalyst layers and electrically connecting the solar cell units in series.

In the above-mentioned electrolytic solutions, DMPII is used as an imidazolium salt for investigation, and also in the case EII, EMII, MPII, BMII, and DMHII are used instead for solar cell modules with the above-mentioned structure, the short circuit current density with the iodine concentration as shown in Table 3 is investigated to find it is almost the same in the porous photoelectric conversion layer side and the catalyst layer side as the light receiving face (in neighboring cell units).

TABLE 3

| | EII | EMII | MPII | BMII | DMHII |
|---|---|---|---|---|---|
| Light receiving face: porous photoelectric conversion layer side | 0.05 (a) | 0.05 (c) | 0.05 (e) | 0.04 (g) | 0.05 (i) |
| Light receiving face: catalyst layer side | 0.03 (b) | 0.02 (d) | 0.02 (f) | 0.02 (h) | 0.03 (j) |

Further, even if different imidazolium salts and iodine concentrations are employed for neighboring cell units in a single solar cell module, it is confirmed that the neighboring cell units have almost the same short circuit current. Examples of the combinations of porous photoelectric conversion layer side: catalyst layer side as the light receiving face are the combination of (a):(d) in Table 3 and the combination of (DMPII as an imidazolium salt, iodine concentration 0.05 M):(f) in Table 3.

Hereinafter, Embodiment 1 of the present invention will be described more in detail along with Production Example, Examples, and Comparative Examples, however it is not intended that the present invention be limited to the illustrated Production Example, Examples, and Comparative Examples. In Examples and Comparative Examples, unless otherwise specified, dye-sensitized solar cells are produced under the conditions of Production Example.

EXAMPLE 1 AND ITS PRODUCTION EXAMPLE

A dye-sensitized solar cell module in which five solar cell units were connected in series and integrated as shown in FIG. 1 was produced. The production process will be described below.

Two glass substrates having $SnO_2$ manufactured by Nippon Sheet Glass Co., Ltd. were used as supports with a size of 53 mm×65 mm (substrate X) and with a size of 39 mm×65 mm (substrate Y) having conductive layers 1 and 5, respectively. In FIG. 2, platinum was deposited in a thickness of about 5 nm by sputtering as catalyst layers 14 and 4 in a manner that the widths of A, B, C, D, E, and F were to be 18 mm, 18 mm, 5 mm, 7 mm, 5 mm, and 5 mm, respectively.

Next, a titanium oxide paste (trade name: D/SP, manufactured by Solaronix) was applied in a form as to give a shape of 5 mm width×50 mm length×15 μm thickness after firing to the conductive layers 1 and 5 by a screen printing apparatus (LS-150, manufactured by Newlong Seimitsu Kogyo Co., Ltd.), leveled at a room temperature for 1 hour, successively dried at 80° C. in an oven, and fired at 500° C. in air to form porous photoelectric conversion layers 2 and 12.

Next, laser beam (YAG laser: basic wavelength 1.06 μm) was radiated to $SnO_2$, conductive layers 1 and 5, in a manner that the widths of I, J, K, and L shown in FIG. 2 were to be 17.5 mm, 23.5 mm, 16.5 mm, and 10.5 mm to evaporate $SnO_2$ and form scribed grooves 21.

After that, the ruthenium dye defined by the above-mentioned formula (II) (trade name: Ruthenium 620 1H3TBA, manufactured by Solaronix) was dissolved in a concentration of $4\times10^{-4}$ mole/l in a solvent mixture of acetonitrile and tert-butanol mixed at 1:1 by volume to produce a dye solution for adsorption and the substrates X and Y subjected to the above-mentioned treatment were immersed in the solution to adsorb the dye in porous photoelectric conversion layers 2 and 12.

Next, while Himilan 1855 (manufactured by Du Pont) cut into a size of 1 mm×60 mm as an insulating layer 5 was put on the respectively scribed portions 21 of the substrates, the substrates X and Y subjected to the above-mentioned treatment were stuck to each other in the form shown in FIG. 1 and pressure bonded by heating at about 100° C. for 10 minutes.

Successively, as electrolytic solutions, an electrolytic solution A (iodine concentration: M2) was produced by dissolving 0.6 mole/l of DMPII (manufactured by Shikoku Chemicals Corp.), 0.1 mole/l of LiI (manufactured by Aldrich), 0.5 mole/l of TBP (manufactured by Aldrich), and 0.02 mole/l of $I_2$ (manufactured by Kishida Chemical Co., Ltd.) in acetonitrile as a solvent and an electrolytic solution B (iodine concentration: M1) was produced by dissolving the same compounds in the same concentrations as those of the electrolytic solution A except that 0.05 mole/l of $I_2$ was dissolved.

The electrolytic solution B was injected into the cell units (a) of the dye-sensitized solar cell module shown in FIG. 1 and the electrolytic solution A was injected into the cell units (b) by capillary effect and thereafter, the peripheral portions of the cells were sealed with an epoxy resin to produce the dye-sensitized solar cell module. In this case, the iodine concentration ratio M1/M2 was 2.5, within the range from 1 to 5.

The dye-sensitized solar cell module of Example 1 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 13.9 mA/cm², the open circuit voltage value was 3.15 V, FF was 0.58, and the module conversion efficiency was 5.1%. The short circuit current density was calculated by employing the surface area of single cells composing the module.

EXAMPLES 2 TO 9

Dye-sensitized solar cell modules of Examples 2 to 9 were produced in the same manner as the dye-sensitized solar cell module of Example 1, except that the imidazolium salts and the iodine concentrations were changed and the operation properties were investigated in the same manner as Example 1. The results are shown in Table 4. The concentrations of the electrolytic solutions were adjusted to be the same except the iodine concentration.

COMPARATIVE EXAMPLE 1

A dye-sensitized solar cell module of Comparative Example 1 was produced in the same manner as the dye-sensitized solar cell module of Example 1, except that the electrolytic solution B was used for both of the cell units (a) and (b) and the operation properties were investigated in the same manner as Example 1. The results are shown in Table 4.

TABLE 4

|  | Electrolytic solution A | | Electrolytic solution B | | Short circuit current density (mA/cm²) | Open circuit voltage (V) | FF | Conversion efficiency (%) |
|---|---|---|---|---|---|---|---|---|
|  | Imidazolium salt | Iodine concentration mole/l | Imidazolium salt | Iodine concentration mole/l |  |  |  |  |
| Example 2 | EII | 0.03 | EII | 0.05 | 14.7 | 3.11 | 0.59 | 5.4 |
| Example 3 | EMII | 0.02 | EMII | 0.05 | 14.6 | 3.19 | 0.63 | 5.9 |
| Example 4 | MPII | 0.02 | MPII | 0.05 | 14.0 | 3.23 | 0.64 | 5.8 |
| Example 5 | MBII | 0.02 | BMII | 0.05 | 14.1 | 3.20 | 0.65 | 5.9 |
| Example 6 | HMII | 0.03 | HMII | 0.05 | 14.2 | 3.20 | 0.64 | 5.8 |

TABLE 4-continued

| | Electrolytic solution A | | Electrolytic solution B | | Short circuit current density (mA/cm$^2$) | Open circuit voltage (V) | FF | Conversion efficiency (%) |
|---|---|---|---|---|---|---|---|---|
| | Imidazolium salt | Iodine concentration mole/l | Imidazolium salt | Iodine concentration mole/l | | | | |
| Example 7 | DMHII | 0.03 | DMHII | 0.05 | 13.4 | 3.15 | 0.60 | 5.1 |
| Example 8 | EMII | 0.02 | EII | 0.05 | 14.5 | 3.18 | 0.63 | 5.8 |
| Example 9 | MPII | 0.02 | DMPII | 0.05 | 14.0 | 3.17 | 0.63 | 5.6 |
| Comparative Example 1 | DMPII | 0.05 | DMPII | 0.05 | 9.5 | 3.22 | 0.67 | 4.1 |

It is understood from Table 4 that the short circuit current density is high in Examples 2 to 9 as compared with that in Comparative Example 1 and high current density can be obtained by the integrated dye-sensitized solar cell modules of the present invention if the modules have the characteristics of the present invention, even in the case the size of the modules is as small as 53 mm×65 mm. Also, even in the case the imidazolium salt in the cell units (first photoelectric conversion element) having the light receiving face in the porous photoelectric conversion layer side is different from the imidazolium salt in the cell units (second photoelectric conversion element) having the light receiving face in the catalyst layer side, a relatively high short circuit current density is obtained.

[Embodiment 2]

Similarly to the above-mentioned Embodiment 1, a dye-sensitized solar cell of Embodiment 2 is characterized in that first photoelectric conversion elements (a) and second photoelectric conversion elements (b) have different compositions of electrolytic layers 3 and 13.

Practically the compositions of the electrolytic layers 3 and 13 of the first photoelectric conversion elements (a) and the second photoelectric conversion elements (b) are made different as described (6) to (9) below.

(6) An imidazolium salt is contained in at least one electrolytic layer of one or more of first photoelectric conversion elements and one or more of the second photoelectric conversion elements (7) The imidazolium salt is a salt of a compound defined by the following formula (I)

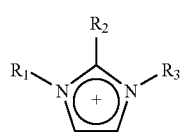

(I)

wherein $R_1$ and $R_2$ independently denote a hydrogen atom or methyl; $R_3$ denotes methyl, ethyl, propyl, butyl, or hexyl (the same as (4) of Embodiment 1).

(8) The imidazolium salts contained in the respective electrolytic layers 3 and 13 of the first photoelectric conversion elements (a) and the second photoelectric conversion elements (b) are different (the same as (5) of Embodiment 1).

(9) Lithium iodide is contained in an electrolytic layer of at least one element among one or more of the first photoelectric conversion elements (a) and one or more of the second photoelectric conversion elements (b).

With such a constitution, desirable solar cell properties can be obtained.

Cell units are produced in the same manner as Embodiment 1, except that the electrolytic solutions of the solar cell units of Embodiment 2 are different from those of Embodiment 1.

As electrolytic solutions are used an electrolytic solution A containing 0.6 mole/l of DMPII, 0.1 mole/l of LiI, 0.5 mole/l of TBP, and 0.05 mole/l of I$_2$ dissolved in acetonitrile as a solvent and an electrolytic solution B containing 0.8 mole/l of DMPII, 0.5 mole/l of TBP, and 0.05 mole/l of I$_2$ dissolved in acetonitrile.

The properties of two kinds of dye-sensitized solar cells produced by the above-mentioned electrolytic solutions A and B are measured. The measurement is carried out by radiating light to the porous photoelectric conversion layer side and the catalyst layer side of the respective solar cells. The results are shown in Table 5.

TABLE 5

| | Light receiving face | | | |
|---|---|---|---|---|
| | Porous photoelectric conversion layer side | | Catalyst layer side | |
| Electrolytic solution | A | B | A | B |
| Short circuit current density (mA/cm$^2$) | 15.30 | 12.94 | 9.20 | 7.78 |
| Open circuit voltage value (V) | 0.650 | 0.722 | 0.63 | 0.700 |
| FF | 0.670 | 0.708 | 0.700 | 0.739 |
| Conversion efficiency (%) | 6.66 | 6.62 | 4.06 | 4.03 |

From the results shown in Table 5, it is confirmed that approximately the same photoelectric conversion efficiency is obtained in the respective radiated faces using the electrolytic solution A and the respective radiated faces using the electrolytic solution B by adding LiI or no LiI and changing the concentration of DMPII. However, other properties (short circuit current density, open circuit voltage, and FF) are found having considerable difference.

Next, using the electrolytic solution A and the electrolytic solution B for the electrolytic layers of respective cell units, a dye-sensitized solar cell module comprising a cell unit having the light receiving face in the porous photoelectric conversion layer side and a cell unit having the light receiving face in the catalyst layer side and connected in series is produced and the solar cell module will be described below.

In the case the electrolytic solution B is used in the cell unit having the light receiving face in the porous photoelectric conversion layer side and the electrolytic solution A is used in the cell unit having the light receiving face in the catalyst layer side, the property evaluation is carried out and it is found that the short circuit current density is 9.10 (mA/cm$^2$); open circuit voltage value is 1.348 (V); FF is 0.680; and the conversion efficiency 4.17(%).

In the case the electrolytic solution A is used for the respective cell units, it is found that the short circuit current density is 9.00 (mA/cm$^2$); open circuit voltage value is 1.260 (V); FF is 0.654; and the conversion efficiency 3.71(%).

Also, in the case the electrolytic solution B is used for the respective cell units, it is found that the short circuit current density is 7.67 (mA/cm$^2$); open circuit voltage value is 1.410 (V); FF is 0.682; and the conversion efficiency 3.69(%).

Basically, in the case the solar cell units are connected in series, the current value of the module is not the current value of the cell unit with the higher current value but the voltage value becomes the total. In the case the electrolytic solution A is used for the respective cell units, the short circuit current density is high in the case the light receiving face is in the porous photoelectric conversion layer side and the short circuit current density is low in the case the light receiving face is in the catalyst layer side, so that the output power of the module in which the respective cell units are connected in series may be decreased.

Therefore, if cell units are produced by using respectively an electrolytic substance composition with which the open circuit voltage value becomes high even if the short circuit current density is relatively low just like the electrolytic solution B used in the case the light receiving face is set in the porous photoelectric conversion layer side and an electrolytic substance composition with which the short circuit current density becomes relatively high just like the electrolytic solution A used in the case the light receiving face is set in the catalyst layer side, thereby it is found that the output of the dye-sensitized solar cell module becomes high.

Generally, it is said that the open circuit voltage value of a dye-sensitized solar cell is determined in accordance with the redox level (in the above-mentioned case $I_3^-$ and $I^-$) of the electrolytic solution and Fermi level of the porous photoelectric conversion layer (in the above-mentioned case, titanium oxide). Although the above-mentioned electrolytic solution A and electrolytic solution B are different in the concentration of DMPII and the existence of LiI, generally lithium ion derived from LiI lowers the surface level of titanium oxide, so that the open circuit voltage value tends to be decreased in the case of the dye-sensitized solar cell. These phenomena differ depending on the dye to be used and the porous photoelectric conversion layer and therefore it is made possible to produce a dye-sensitized solar cell module which generates higher output power than that of a conventional technique by adjusting the electrolytic solution compositions of the respective constituent materials for the respective unit cells.

The ratio of the redox seeds such as $I_3^-$ and $I^-$ in the electrolytic solution is changed in accordance with the types of the imidazolium compounds such as DMPII.

Using EII, EMII, MPII, HMII, and imidazole (hereinafter, abbreviated as Imid. in some cases) as the imidazolium compounds other than DMPII, dye-sensitized solar cells are produced and the properties are evaluated. The electrolytic substance concentrations are adjusted as 0.6 mole/l for an imidazolium compound; 0.1 mole/l for LiI; 0.05 mole/l for $I_2$; and 0.5 mole/l for TBP and acetonitrile is used as a solvent.

The measurement is carried out while the light-irradiated face in the conductive layer side and the catalyst layer side of the respective dye-sensitized solar cells. The results in the case light-irradiated face is set in the conductive layer side are shown in Table 6 and the results in the case light-irradiated face is set in the catalyst layer side are shown in Table 7.

TABLE 6

(Light receiving face: conductive layer side)

| | Imidazolium compound | | | |
|---|---|---|---|---|
| | EII | EMII | MPII | HMII |
| Short circuit current density (mA/cm$^2$) | 15.96 | 15.96 | 15.54 | 14.75 |
| Open circuit voltage value (V) | 0.627 | 0.655 | 0.671 | 0.674 |
| FF | 0.681 | 0.683 | 0.691 | 0.701 |
| Conversion efficiency (%) | 6.82 | 7.15 | 7.21 | 6.96 |

| | Imidazolium compound | |
|---|---|---|
| | Imid | DMPII (From Table 5) |
| Short circuit current density (mA/cm$^2$) | 15.26 | 15.30 |
| Open circuit voltage value (V) | 0.679 | 0.650 |
| FF | 0.645 | 0.670 |
| Conversion efficiency (%) | 6.68 | 6.66 |

TABLE 7

(Light receiving face: catalyst layer side)

| | Imidazolium compound | | | |
|---|---|---|---|---|
| | EII | EMII | MPII | HMII |
| Short circuit current density (mA/cm$^2$) | 9.72 | 9.78 | 9.29 | 8.82 |
| Open circuit voltage value (V) | 0.611 | 0.642 | 0.654 | 0.653 |
| FF | 0.710 | 0.708 | 0.731 | 0.738 |
| Conversion efficiency (%) | 4.22 | 4.45 | 4.44 | 4.25 |

| | Imidazolium compound | |
|---|---|---|
| | Imid | DMPII (from Table 5) |
| Short circuit current density (mA/cm$^2$) | 9.30 | 9.20 |
| Open circuit voltage value (V) | 0.661 | 0.630 |
| FF | 0.677 | 0.700 |
| Conversion efficiency (%) | 4.16 | 4.06 |

From Table 6 and Table 7, it is confirmed that the values of the respective properties are changed depending on the respective imidazolium compounds. Accordingly, it is made possible to produce dye-sensitized solar cell modules in accordance with various purposes by respectively changing the imidazolium compounds in the electrolytic substances in the cell units composing the modules.

For example, in the case the current value is to be increased, since EMII gives the highest value with reference to the imidazolium compounds shown in Table 6 and 7, it is preferable to use EMII for the electrolytic solution A. In the case the voltage value is to be increased, since Imid. gives the highest value, it is preferable to use Imid. for at least one electrolytic solution. In above-description, in terms of the photoelectric conversion efficiency, it is preferable to use EMII for the electrolytic solution A and HMII for the electrolytic solution B and in the case two dye-sensitized solar cells connected in series, the short circuit current density is 9.69 (mA/cm$^2$); the open circuit voltage value is 1.318 (V); the FF is 0.680; and the conversion efficiency 4.34(%).

Hereinafter, Embodiment 2 of the present invention will be described more in detail along with Production Example, Examples, and Comparative Examples, however it is not intended that the present invention be limited to the illustrated Production Example, Examples, and Comparative Examples. In Examples and Comparative Examples, unless otherwise specified, dye-sensitized solar cells are produced under the conditions of Production Example.

EXAMPLE 10 AND ITS PRODUCTION EXAMPLE

A dye-sensitized solar cell module in which five solar cell units were connected in series and integrated was produced in the same manner as Example 1, except that the electrolytic solutions for the electrolytic layers were changed. Hereinafter, only the points of the production process of Example 10 different from Example 1 will be described below.

As electrolytic solutions, acetonitrile was used as a solvent and an electrolytic solution A was produced by dissolving 0.6 mole/l of DMPII, 0.1 mole/l of LiI, 0.5 mole/l of TBP, and 0.02 mole/l of $I_2$ in acetonitrile and an electrolytic solution B was produced by dissolving 0.8 mole/l of DMPII, 0.5 mole/l of TBP, and 0.05 mole/l of $I_2$ in acetonitrile.

The electrolytic solution B was injected into the cell units (a) of the dye-sensitized solar cell module shown in FIG. 1 and the electrolytic solution A was injected into the cell units (b) by capillary effect and thereafter, the peripheral portions of the cells were sealed with an epoxy resin to produce the dye-sensitized solar cell module.

The produced dye-sensitized solar cell module was put on a black stage in which the substrate Y side was controlled to be at 25° C. and the substrate X side was put in the light receiving face and the operation properties under the condition of simulating AM 1.5 sunlight were investigated. The results were 9.20 mA/cm² of the short circuit current density; 3.40 V of the open circuit voltage value; 0.681 of FF; and 4.26% of the module conversion efficiency.

EXAMPLES 11 TO 14

Dye-sensitized solar cell modules of Examples 11 to 14 were produced in the same manner as the dye-sensitized solar cell module of Example 10, except that the imidazolium salts were changed and the operation properties were investigated in the same manner as Example 10. The results are shown in Table 8. The imidazolium compounds of the employed electrolytic solutions were shown in Table 9. The compositions and the concentrations of other components were the same as those of Example 10.

COMPARATIVE EXAMPLE 2

A dye-sensitized solar cell module of Comparative Example 2 was produced in the same manner as the dye-sensitized solar cell module of Example 10, except that the electrolytic solution A was used for both of the cell units (a) and (b) and the operation properties were investigated in the same manner as Example 10. The results are shown in Table 8.

TABLE 8

| | Short circuit current density (mA/cm²) | Open circuit voltage (V) | FF | Conversion efficiency (%) |
|---|---|---|---|---|
| Example 11 | 9.77 | 3.23 | 0.690 | 4.35 |
| Example 12 | 9.33 | 3.28 | 0.680 | 4.16 |
| Example 13 | 9.69 | 3.21 | 0.700 | 4.28 |
| Example 14 | 9.72 | 3.46 | 0.678 | 4.56 |
| Comparative Example 2 | 9.08 | 3.10 | 0.651 | 3.66 |

TABLE 9

| | Electrolytic solution A | Electrolytic solution B |
|---|---|---|
| Example 11 | EMII | DMPII |
| Example 12 | Imid. | DMPII |
| Example 13 | EII | MPII |
| Example 14 | HMII | EMII |
| Comparative Example 2 | DMPII | DMPII |

It is understood from Table 8 that the short circuit current density and the photoelectric conversion efficiency are high in Examples 11 to 14 as compared with those in Comparative Example 2 and it is found that if the integrated dye-sensitized solar cell modules have the characteristics of the present invention, even in the case the size of the modules is as small as 53 mm×65 mm, the solar cell modules have highly powerful solar cell properties.

[Embodiment 3]

A dye-sensitized solar cell of Embodiment 3 is characterized in that first photoelectric conversion elements (a) and second photoelectric conversion elements (b) have different thicknesses of the porous photoelectric conversion layers 2 and 12.

Practically the thicknesses of the porous photoelectric conversion layers 2 and 12 of the first photoelectric conversion elements (a) and the second photoelectric conversion elements (b) are made different as described (10) and (11) below.

(10) The thickness of the porous photoelectric conversion layer of the first photoelectric conversion elements is thinner than the thickness of the porous photoelectric conversion layer of the second photoelectric conversion elements.

With such a constitution, the electric current of respective unit cells of the first photoelectric conversion layers and the second photoelectric conversion layers of the solar cell module can efficiently be extracted.

(11) The ratio (Jc/Jd) satisfies the inequality of (Jc/Jd)>0.7 wherein Jd denotes the short circuit current density of the first photoelectric conversion elements and Jc denotes the short circuit current density of the second photoelectric conversion elements.

With such a constitution, a high conversion efficiency of the module can be obtained. In this connection if (Jc/Jd)<0.7, conversion efficiency of the module may adversely be decreased and therefore it is not preferable.

In the case the catalyst layer exists in the light receiving face side, the quantity of light reaching the photoelectric conversion layer is decreased because of the absorption by iodine and the electrolytic substances in the electrolytic solution as described above. Also, if a plurality of dye-sensitized solar cells are connected in series, the obtained short circuit current is controlled on the basis of the lowest short circuit current of the dye-sensitized solar cells. Accordingly, if the method of direct connection of the present invention is employed and in the case dye-sensitized solar cells with the same constitutions are employed, since the short circuit current of a solar cell in which the porous photoelectric conversion layer exists in the light receiving face side is higher than the short circuit current of a solar cell in which the catalyst layer exists in the light receiving face side, the short circuit current density of the solar cell in which the porous photoelectric conversion layer exists cannot entirely be extracted and the module conversion efficiency is considerably decreased more than the photoelectric conversion efficiency of a single dye-sensitized solar cell.

On the other hand, in a dye-sensitized solar cell, if the thickness of the photoelectric conversion layer is changed, the voltage and the current density is changed and if the thickness is made thick, the voltage tends to be low and the current density tends to increase. For example, in the case the thicknesses of photoelectric conversion layers are made the same, the short circuit current can efficiently be extracted and the open circuit voltage can be increased by making the thickness of single dye-sensitized solar cells in which the short circuit current density is increased thin and accordingly it is expected that the module conversion efficiency is increased.

In Embodiment 3, cell units are produced in the same manner as Embodiment 1, except that the electrolytic solution of the solar cell units and the thicknesses of the porous photoelectric conversion layers are made different.

As the electrolytic solution is used an electrolytic solution using acetonitrile as a solvent containing 0.6 mole/l of HMII, 0.1 mole/l for LiI, 0.5 mole/l for TBP, and 0.01 mole/l for $I_2$. On the other hand, the thicknesses of the porous photoelectric conversion layers are four types; 8, 12, 16, and 20 μm and four types of dye-sensitized solar cells are produced. The measurement is carried out for the four types of the solar cells by radiating light to porous photoelectric conversion layer side and the catalyst layer side of the solar cells. The results in the case light-irradiated face is set in the porous photoelectric conversion layer side are shown in Table 10 and the results in the case light-irradiated face is set in the catalyst layer side are shown in Table 11.

TABLE 10

| | Thickness of photoelectric conversion layer (μm) | | | |
|---|---|---|---|---|
| | 8 | 12 | 16 | 20 |
| Short circuit current density (mA/cm$^2$) | 10.5 | 14.5 | 15.7 | 16.2 |
| Open circuit voltage value (V) | 0.72 | 0.69 | 0.67 | 0.65 |
| FF | 0.68 | 0.67 | 0.66 | 0.65 |
| Conversion efficiency (%) | 5.1 | 6.7 | 6.8 | 7.0 |

TABLE 11

| | Thickness of photoelectric conversion layer (μm) | | | |
|---|---|---|---|---|
| | 8 | 12 | 16 | 20 |
| Short circuit current density (mA/cm$^2$) | 7.2 | 11.6 | 13.3 | 14.1 |
| Open circuit voltage value (V) | 0.71 | 0.68 | 0.66 | 0.65 |
| FF | 0.70 | 0.69 | 0.67 | 0.66 |
| Conversion efficiency (%) | 3.5 | 4.1 | 4.5 | 5.0 |

Figure 4:
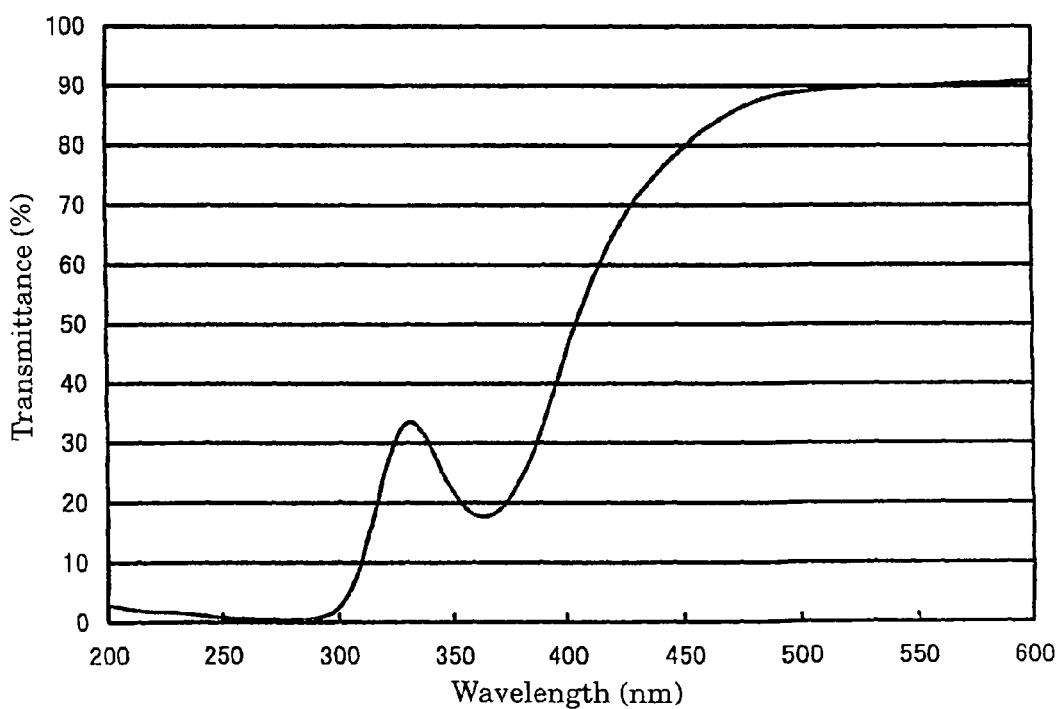
FIG. 4 is a graph showing the measurement results of the transmittance and absorbance of the electrolytic solution in Embodiment 3 of the present invention.

As being understood from Table 10 and Table 11, in the case the light receiving face is set in the porous photoelectric conversion layer side, the current density is increased and the open circuit voltage is decreased as the thickness of the porous photoelectric conversion layer is increased. In the case the light receiving face is set in the catalyst layer side, the respective property values are considerably changed and as compared with that in the case the light receiving face is set in the porous photoelectric conversion layer side, the short circuit current density is decreased, however the correlations of the thickness of the photoelectric conversion layer with the electric current density and the voltage are the same as those in the case the light receiving face is set in the porous photoelectric conversion layer side. That is, it is supposed that in the case the light receiving face is set in the catalyst layer side, light is absorbed by iodine contained in the electrolytic solution part and therefore the properties are changed considerably. The results of the measurement of the transmittance and absorbance of the electrolytic solutions are shown in FIG. 4.

The measurement is carried out by setting a 30 μm-thick separator between glass substrates with the same sizes and shapes of the actual dye-sensitized solar cell, injecting the electrolytic solution with the above-mentioned composition between the glass substrates, and radiating light to the glass substrates. As a result, with respect to the light rays with wavelength of about 300 to 550 nm, it is found that the transmittance generally tends to be decreased more as the wavelength becomes shorter. The decrease of the transmittance is supposed to considerably affect the short circuit current density in the case the light receiving face is set in the catalyst layer side.

In the case a dye-sensitized solar cell module with the structure as shown in FIG. 1 by using the above-mentioned unit cells, from the results of the experiments shown in Table 10 and Table 11, the short circuit current is about 29.0 mA when the light receiving face is set in the porous photoelectric conversion layer side and 23.2 mA when the light receiving face is set in the catalyst layer side if the thickness of the porous photoelectric conversion layer is 12 μm. Therefore, in the case a series connection type dye-sensitized solar cell module is produced, the current of the module is controlled on the basis of the short circuit current value of the unit cells in which the light receiving face is set in the catalyst layer side and the short circuit current value of the unit cells in which the light receiving face is set in the porous photoelectric conversion layer side cannot be used advantageously and thus the conversion efficiency of the module is considerably decreased as compared with the photoelectric conversion efficiency of a single dye-sensitized solar cell.

Accordingly, based on the results of Table 10 and Table 11, while the thickness of the photoelectric conversion layer of the cell unit in which the light receiving face is set in the porous photoelectric conversion layer side is adjusted to be 12 μm and the thickness of the photoelectric conversion layer of the cell unit in which the light receiving face is set in the catalyst layer side is adjusted to be 20 μm, a dye-sensitized solar cell module comprising two cells connected in series is produced. As a result, in the properties of the respective cell units themselves, the short circuit current density is 14.5 (mA/cm$^2$) and the open circuit voltage value is 0.69 (V) for the unit cell in which the light receiving face is set in the porous photoelectric conversion layer side; the short circuit current density is 14.1 (mA/cm$^2$) and the open circuit voltage value is 0.65 (V) for the unit cell in which the light receiving face and set in the catalyst layer side; and the short circuit current density is 14.4 (mA/cm$^2$) and the open circuit voltage value is 1.33 (V) for the dye-sensitized solar cell module comprising two unit cells connected in series.

As described, the electric current values of respective unit cells are consequently advantageously utilized by making the thickness of the cell unit in which the light receiving face is set in the porous photoelectric conversion layer side different from the thickness of the cell unit in which the light receiving face is set in the catalyst layer side. Further, in the case the thickness of the photoelectric conversion layer of the cell unit in which the light receiving face is set in the porous photoelectric conversion layer side is adjusted to be 20 μm the same as that of the photoelectric conversion layer of the cell unit in which the light receiving face is set in the catalyst layer side, the open circuit voltage value is about 0.65 (V) according to the results shown in Table 10 and it is increased to 0.69 (V) by changing the thickness to be 12 μm. As a result, if the constitution of the dye-sensitized solar cell module of Embodiment 3 is employed, the ratio of the increase of the open circuit voltage is more significant than the ratio of the decrease of the photoelectric conversion efficiency due to the decrease of the current value of the module and accordingly the photoelectric conversion efficiency can be increased as a whole.

Figure 5:
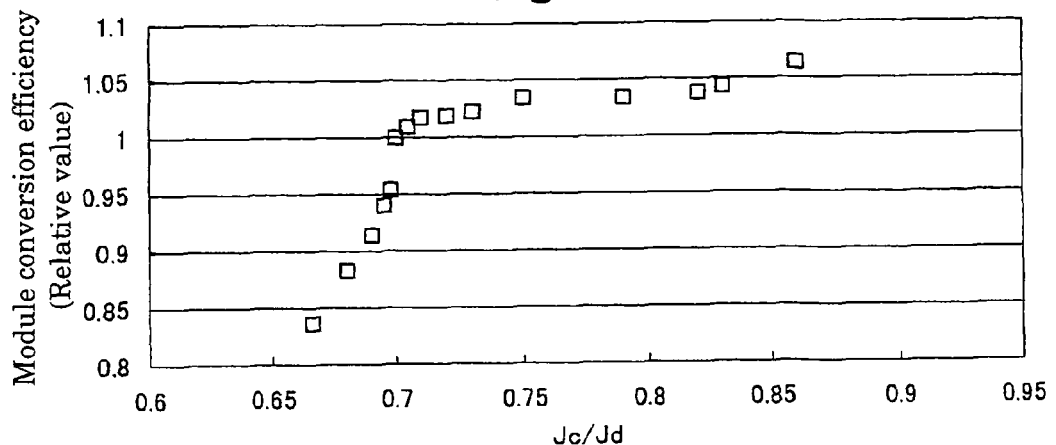
FIG. 5 is a graph showing the correlation of (Jc/Jd) with the module conversion efficiency in Embodiment 3 of the present invention.

Further, the thickness of the photoelectric conversion layer of the cell unit in which the light receiving face is set in the porous photoelectric conversion layer side and the thickness of the photoelectric conversion layer of the cell unit in which the light receiving face is set in the catalyst layer side are changed and the short circuit current density of the respective cell units and the photoelectric conversion efficiency of the module are measured. The relation between (Jc/Jd) and ηm understood from the measurement results is shown in FIG. 5. Herein, Jd denotes the short circuit current density of the cell unit in which the light receiving face is set in the porous photoelectric conversion layer side; Jc denotes the short circuit current density of the cell unit in which the light receiving face is set in the catalyst layer side; and ηm denotes the conversion efficiency of the module.

As being understood from FIG. 5, if the difference of the electric current values is made small by adjusting the thickness of the cell unit in which the light receiving face is set in the porous photoelectric conversion layer side and the cell unit in which the light receiving face is set in the catalyst layer side, the energy is extracted at a high efficiency and when (Jc/Jd) satisfies (Jc/Jd)>0.7, the conversion efficiency of the module is high and when (Jc/Jd) satisfies (Jc/Jd)>0.85, the conversion efficiency of the module is higher.

In this experiment, the conversion efficiency of a module is investigated while the thickness of the cell unit in which the light receiving face is set in the porous photoelectric conversion layer side is adjusted to be 8 µm and the thickness of the cell unit in which the light receiving face is set in the catalyst layer side is changed and accordingly, it is found that if the thickness of the cell unit in which the light receiving face is set in the catalyst layer side is made thicker than 8 µm of the thickness of the photoelectric conversion layer, the conversion efficiency of a module is increased. From these findings, it is found that the ratio td/tc of the thickness td of the photoelectric conversion layer of the cell unit in which the light receiving face is set in the porous photoelectric conversion layer side and the thickness tc of the photoelectric conversion layer of the cell unit in which the light receiving face is set in the catalyst layer side is preferably higher than 0.25 and lower than 1, more preferably in a range from 0.3 to 0.95, furthermore preferably in a range from 0.4 to 0.9, and even more preferably in a range from 0.6 to 0.85.

Hereinafter, Embodiment 3 of the present invention will be described more in detail along with Production Example, Examples, and Comparative Examples, however it is not intended that the present invention be limited to the illustrated Production Example, Examples, and Comparative Examples. In Examples and Comparative Examples, unless otherwise specified, dye-sensitized solar cells are produced under the conditions of Production Example.

EXAMPLE 15 AND ITS PRODUCTION EXAMPLE

A dye-sensitized solar cell module (reference to FIG. 1) in which five solar cell units were connected in series and integrated was produced in the same manner as Example 1, except that the electrolytic solutions for the electrolytic layers and the thickness of the porous photoelectric conversion layers were changed. Hereinafter, only the points of the production process of Example 15 different from Example 1 will be described below.

The thickness of the titanium oxide film as the porous photoelectric conversion layers was adjusted to be 12 µm for the cell units in which the light receiving face was set in the porous photoelectric conversion layer side and to be 20 µm for the cell units in which the light receiving face was set in the catalyst layer side.

As electrolytic solutions, cetonitrile was used as a solvent and an electrolytic solution was produced by dissolving 0.6 mole/l of HMII, 0.1 mole/l of LiI, 0.5 mole/l of TBP, and 0.01 mole/l of $I_2$ in acetonitrile and the electrolytic solution was used.

The dye-sensitized solar cell module of Example 15 produced in the above-mentioned manner was put on a black stage in which the substrate Y side was controlled to be at 25° C. and the substrate X side was put in the light receiving face and the operation properties under the condition of simulating AM 1.5 sunlight were investigated. The results were 14.4 mA/cm$^2$ of the short circuit current density; 3.37 V of the open circuit voltage value; 0.66 of FF; and 6.41% of the module conversion efficiency.

EXAMPLES 16

The dye-sensitized solar cell module of Example 16 was produced as described below in a similar manner to that of the production example of Example 15. In the case of cell units in which the light receiving face was set in the porous photoelectric conversion layer side, in the porous photoelectric conversion layer formation, first a titanium oxide paste (trade name: T/SP; manufactured by Solaronix) was printed from the transparent conductive layer side and fired and then a titanium oxide paste (trade name: D/SP; manufactured by Solaronix) was printed and fired to form a 10 µm-thick porous photoelectric conversion layer. In the case of cell units in which the light receiving face was set in the catalyst layer side, in the porous photoelectric conversion layer formation, D/SP was printed from the conductive layer side and fired and then T/SP was printed and fired to form a 21 µm-thick porous photoelectric conversion layer.

The operation properties under the condition of simulating AM 1.5 sunlight were investigated for the produced dye-sensitized solar cell module to find that the short circuit current density was 15.2 mA/cm$^2$, the open circuit voltage value was 3.37 V, FF was 0.66, and the module conversion efficiency was 6.76%.

COMPARATIVE EXAMPLE 3

A dye-sensitized solar cell module of Comparative Example 3 was produced in the same manner as the production example of Example 15, except that the thickness of all of the porous photoelectric conversion layers was adjusted to be 12 µm.

The operation properties under the condition of simulating AM 1.5 sunlight were investigated for the produced dye-sensitized solar cell module to find that the short circuit current density was 12.6 mA/cm$^2$, the open circuit voltage value was 3.435 V, FF was 0.674, and the module conversion efficiency was 5.82%.

COMPARATIVE EXAMPLE 4

A dye-sensitized solar cell module of Comparative Example 5 was produced in the same manner as the production example of Example 15, except that the thickness of all of the porous photoelectric conversion layers was adjusted to be 20 µm.

The operation properties under the condition of simulating AM 1.5 sunlight were investigated for the produced dye-sensitized solar cell module to find that the short circuit current density was 15.0 mA/cm², the open circuit voltage value was 3.25 V, FF was 0.644, and the module conversion efficiency was 6.27%.

From the above described results, it is found that the integrated dye-sensitized solar cell modules of Examples 15 and 16 have a high conversion efficiency since they satisfy the characteristics of the present invention even if the modules have a size as small as 53 mm×65 mm. Also, even in the following embodiment, a high conversion efficiency can be obtained. Practically, the light receiving surface area is made different by changing the widths of the porous photoelectric conversion layers 2 and 12 of the first photoelectric conversion elements (a) and the second photoelectric conversion elements (b) shown in FIG. 1.

[Embodiment 4]

The light receiving surface area of the porous photoelectric conversion layers 2 and 12 of the first photoelectric conversion elements (a) and the second photoelectric conversion elements (b) is made different practically as described in (12), (13), and (14) below.

(12) The light receiving surface area of the porous photoelectric conversion layers of the second photoelectric conversion elements is larger than light receiving surface area of the porous photoelectric conversion layers of the first photoelectric conversion elements.

With such a constitution, the electric current of respective unit cells of the first photoelectric conversion layers and the second photoelectric conversion layers of the solar cell module can efficiently be extracted.

(13) The width of the porous photoelectric conversion layers of the first photoelectric conversion elements and the second photoelectric conversion elements is made different in the series connection direction of the solar cells.

With such a constitution, the electric current of respective cell units can efficiently be extracted and the transfer distance of electron transferring in the conductive layers is narrowed to improve the fill factor and thus the conversion efficiency is improved. Further the number of the cell units per surface area can be increased to increase the open circuit voltage value of the module.

(14) The light receiving surface areas of the porous photoelectric conversion layers in a plurality of first photoelectric conversion elements are the same and the light receiving surface areas of the porous photoelectric conversion layers in a plurality of second photoelectric conversion elements are the same.

With such a constitution, the output electric power of the solar cell module can most efficiently be extracted.

In the case the catalyst layer exists in the light receiving face side, as described above, the quantity of light reaching the photoelectric conversion layer is decreased because of the absorption by iodine and the electrolytic substances in the electrolytic solution. Accordingly, if the series connection as the present invention is employed, in the case dye-sensitized solar cells with the same constitution are employed, the short circuit current density of the solar cells in which the catalyst layer exists in the light receiving face side becomes lower than the short circuit current density of the solar cells in which the porous photoelectric conversion layer exists in the light receiving face side and accordingly, the conversion efficiency of the module is more significantly decreased than the photoelectric conversion efficiency of single dye-sensitized solar cells.

On the other hand, in a dye-sensitized solar cell, if the light receiving surface area of the photoelectric conversion layer is changed, the short circuit current is changed. For example, the short circuit current can efficiently be extracted by making the light receiving surface area small for the dye-sensitized solar cells in which the short circuit current density is increased in the case the light receiving surface areas of photoelectric conversion layers are made the same. Further, not only the short circuit current can efficiently be extracted by narrowing the width of single dye-sensitized solar cells in the series connection direction in which the short circuit current density is increased in the case the light receiving surface areas of photoelectric conversion layers are made the same but also the number of the cell units per surface area can be increased and accordingly it is expected that the open circuit voltage value is increased and the module conversion efficiency is considerably increased.

In Embodiment 4, cell units are produced in the same manner as Embodiment 1, except that the electrolytic solution of the solar cell units and the thickness and the width of the porous photoelectric conversion layers are different from those of Embodiment 1.

As the electrolytic solution is used an electrolytic solution using acetonitrile as a solvent and containing 0.6 mole/l of DMPII, 0.1 mole/l for LiI, 0.5 mole/l for TBP, and 0.01 mole/l for $I_2$ in acetonitrile. Four types of porous photoelectric conversion layers with a thickness of 30 μm and widths of (A) 3 mm, (B) 4 mm, (C) 5 mm, and (D) 6 mm are employed to produce four types of dye-sensitized solar cells. Measurement is carried out by radiating light to (F) the porous photoelectric conversion layer side and (R) the catalyst layer side of each solar cell. The results obtained by setting the light receiving face in the porous photoelectric conversion layer side are shown in Table 12 and results obtained by setting the light receiving face in the catalyst layer side are shown in Table 13.

TABLE 12

(Light receiving face: porous photoelectric conversion layer side)

|  | Symbol | | | |
| --- | --- | --- | --- | --- |
|  | (A) F | (B) F | (C) F | (D) F |
| Width of porous photoelectric conversion) layer (mm | 3 | 4 | 5 | 6 |
| Short circuit current (mA) | 24.1 | 31.8 | 40.0 | 47.9 |
| Open circuit voltage (V) | 0.68 | 0.67 | 0.68 | 0.68 |
| FF | 0.66 | 0.66 | 0.64 | 0.63 |
| conversion efficiency (%) | 8.98 | 8.71 | 8.84 | 8.70 |

TABLE 13

(Light receiving face: catalyst layer side)

|  | Symbol | | | |
| --- | --- | --- | --- | --- |
|  | (A) R | (B) R | (C) R | (D) R |
| Width of porous photoelectric conversion layer (mm) | 3 | 4 | 5 | 6 |
| Short circuit current (mA) | 19.2 | 25.6 | 32.0 | 38.4 |
| Open circuit voltage (V) | 0.67 | 0.67 | 0.67 | 0.68 |
| FF | 0.67 | 0.68 | 0.66 | 0.64 |
| conversion efficiency (%) | 7.18 | 7.29 | 7.08 | 6.96 |

As being understood from Table 12 and Table 13, in the case the light receiving face is set in the porous photoelectric conversion layer side, the short circuit current is increased and the fill factor is lowered by increasing the width of the porous photoelectric conversion layer. In the case the light receiving face is set in the catalyst layer side, the short circuit current is decreased with any width as compared with that in the case the light receiving face is set in the porous photoelectric conversion layer side, however the relation of the width of the porous photoelectric conversion layer with the current density and the voltage is the same as that in the case the light receiving face is set in the porous photoelectric conversion layer side. It is supposed to be that in the case the light receiving face is set in the catalyst layer side, light is absorbed by iodine contained in the electrolytic solution part and thus the properties are considerably changed.

In the case the dye-sensitized solar cell module with the structure shown in FIG. 1 is produced by using the above-mentioned cell units, from the experiment results of Table 12 and Table 13, in the case the width of the porous photoelectric conversion layer is 5 mm, the short circuit current value is about 40.0 mA if the light receiving face is set in the porous photoelectric conversion layer side and about 32.0 mA if the light receiving face is set in the catalyst layer side. Therefore, in the case a series connection type dye-sensitized solar cell module is produced, the current of the module is considerably decreased as compared with the photoelectric conversion efficiency of the single dye-sensitized solar cell in which the light receiving face is in the porous photoelectric conversion layer side.

Dye-sensitized solar cell modules each comprising two cell units connected in series are produced by setting the light receiving face in the catalyst layer side (CR) in a cell unit of which the photoelectric conversion layer has a width of 5 mm and setting the light receiving face in the porous photoelectric conversion layer side in a cell unit of which the photoelectric conversion layer has a width changed to be (AF) 3 mm, (BF) 4 mm, (CF) 5 mm, or (DF) 6 mm. The results are shown in Table 13.

[Table 14]

TABLE 14

|  | Symbol of the solar cell in which the light receiving face is set in the porous photoelectric conversion layer side | | | |
| --- | --- | --- | --- | --- |
|  | (A) F | (B) F | (C) F | (D) F |
| Width of porous photoelectric conversion layer (mm) | 3 | 4 | 5 | 6 |
| Short circuit current (mA) | 27.2 | 32.0 | 35.7 | 38.8 |
| Open circuit voltage (V) | 1.34 | 1.35 | 1.35 | 1.35 |
| FF | 0.64 | 0.66 | 0.63 | 0.60 |
| Conversion efficiency (%) | 7.29 | 7.92 | 7.59 | 7.14 |

As being understood from Table 14, although the short circuit current is decreased in the case the width (light receiving surface area) of the photoelectric conversion layer of the unit cell in which the light receiving face is set in the porous photoelectric conversion layer side is narrower than the width (light receiving surface area) of the photoelectric conversion layer of the unit cell in which the light receiving face is set in the catalyst layer side, particularly although the short circuit current is decreased in the case the width is 4 mm as compared with that in the case the width is 5 mm, the fill factor is improved and therefore the conversion efficiency become highest. As described, the transfer distance of electron transferring in the conductive layers is narrowed to improve the fill factor and thus the output electric power can be efficiently extracted from each of the unit cells by making the light receiving surface area of the photoelectric conversion layer of a unit cell in which the light receiving face is set in the porous photoelectric conversion layer side different from the light receiving surface area of the photoelectric conversion layer of a unit cell in which the light receiving face is set in the catalyst layer side. Further the number of the unit cells per a certain surface area can be increased and therefore, the open circuit voltage can be increased.

Hereinafter, Embodiment 4 of the present invention will be described more in detail along with a production example, examples, and comparative examples; however, it is not intended that the present invention be limited to the illustrated production example, examples, and comparative examples. In the examples and comparative examples, unless otherwise specified, dye-sensitized solar cells are produced under the conditions of the production example.

EXAMPLE 17 AND ITS PRODUCTION EXAMPLE

A dye-sensitized solar cell module in which five solar cell unit cells were connected in series and integrated as shown in FIG. 1 was produced. The solar cell module was produced in the same manner as Example 1, except that the electrolytic solution of the electrolytic layers was changed, the width of the porous photoelectric conversion layers on the substrate X in the series connection direction was changed to be 4.8 mm, and the interval between the photoelectric conversion layers and the catalyst layers in a single support was changed to be 1.0 mm. Hereinafter, only the different points of the production example of Example 17 from Example 1 will be described.

Two $SnO_2$-bearing glass substrates (substrate X and substrate Y) with a size of 44.4 mm×60 mm manufactured by Nippon Sheet Glass Co., Ltd. were used as supports having conductive layers 1 and 5, respectively. In FIG. 2, platinum was deposited in a thickness of about 5 nm by sputtering as catalyst layers 4 and 14 in a manner that the widths of A, B, C, D, E, and F were to be 13.8 mm, 13.8 mm, 5.0 mm, 6.8 mm, 8.0 mm, and 8.0 mm, respectively.

Next, a titanium oxide paste (trade name: D/SP, manufactured by Solaronix) was applied in a form as to give a shape of 4.8 mm width×50 mm length×15 µm thickness on the substrate X and a shape of 5 mm width×50 mm length×15 µm thickness on the substrate Y after firing to the conductive layers 1 and 5 by a screen printing apparatus (LS-150, manufactured by Newlong Seimitsu Kogyo Co., Ltd.), leveled at a room temperature for 1 hour, successively dried at 80° C. in an oven, and fired at 500° C. in air to form porous photoelectric conversion layers 2 and 12.

Next, laser beam (YAG laser: basic wavelength 1.06 µm) was radiated to $SnO_2$, conductive layers 1 and 5, in a manner that the widths of I, J, K, and L shown in FIG. 2 were to be 13.3 mm, 19.3 mm, 19.3 mm, and 13.3 mm to evaporate $SnO_2$ and form scribed grooves 21.

After that, the ruthenium dye defined by the above-mentioned formula (II) (trade name: Ruthenium 620 1H3TBA, manufactured by Solaronix) was dissolved in a concentration of $4\times10^{-4}$ mole/l in a solvent mixture of acetonitrile and tert-butanol mixed at 1:1 by volume to produce a dye solution for adsorption and the substrates X and Y subjected to the above-mentioned treatment were immersed in the solution to adsorb the dye in the porous photoelectric conversion layers 2 and 12.

Next, while Himilan 1855 (manufactured by Du Pont) cut into a size of 1 mm×60 mm as an insulating layer 5 was put on the respectively scribed portions 21 of the substrates, the substrates X and Y subjected to the above-mentioned treatment were stuck to each other in the form shown in FIG. 1 and pressure bonded by heating at about 100° C. for 10 minutes in an oven.

Successively, as an electrolytic solution to be used, an electrolytic solution was produced by dissolving 0.6 mole/l of DMPII (manufactured by Shikoku Chemicals Corp.), 0.1 mole/l of LiI (manufactured by Aldrich), 0.5 mole/l of TBP (manufactured by Aldrich), and 0.02 mole/l of $I_2$ (manufactured by Kishida Chemical Co., Ltd.) in cetonitrile as a solvent.

The electrolytic solution was injected into the unit cells of the dye-sensitized solar cell module shown in FIG. 1 by capillary effect and thereafter, the peripheral portions of the cells were sealed with an epoxy resin to produce the dye-sensitized solar cell module.

The dye-sensitized solar cell module of Example 17 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 14.1 mA/cm², the open circuit voltage value was 3.48 V, FF was 0.67, and the module conversion efficiency was 6.6%.

COMPARATIVE EXAMPLE 5

A dye-sensitized solar cell module of Comparative Example 6 was produced in the same manner as Example 17, except that the width of the porous photoelectric conversion layers on both of the substrate X and the substrate Y in the series connection direction was adjusted to be 5.0 mm.

The dye-sensitized solar cell module of Comparative Example 6 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 14.0 mA/cm², the open circuit voltage value was 3.48 V, FF was 0.63, and the module conversion efficiency was 6.2%.

EXAMPLE 18

A dye-sensitized solar cell module of Example 18 was produced in the same manner as Example 17, except that the width of the porous photoelectric conversion layers on the substrate X in the series connection direction was adjusted to be 4.4 mm.

The dye-sensitized solar cell module of Example 15 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 14.0 mA/cm², the open circuit voltage value was 3.48 V, FF was 0.68, and the module conversion efficiency was 6.6%.

EXAMPLE 19

A dye-sensitized solar cell module of Example 19 was produced in the same manner as Example 17, except that N719 dye defined by the following formula (trade name: Ruthenium 535-bisTBA, manufactured by Solaronix):

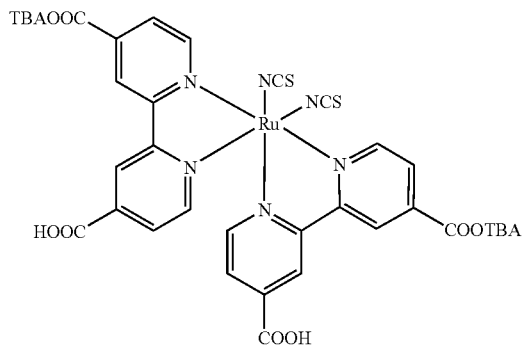

is used as the sensitizing dye and the width of the porous photoelectric conversion layers on the substrate X in the series connection direction was changed to be 4.7 mm.

The dye-sensitized solar cell module of Example 19 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 11.9 mA/cm², the open circuit voltage value was 3.38 V, FF was 0.67, and the module conversion efficiency was 5.4%.

COMPARATIVE EXAMPLE 6

A dye-sensitized solar cell module of Comparative Example 7 was produced in the same manner as Example 17, except that the width of the porous photoelectric conversion layers on both of the substrate X and the substrate Y in the series connection direction was adjusted to be 5.0 mm.

The dye-sensitized solar cell module of Comparative Example 7 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 12.0 mA/cm², the open circuit voltage value was 3.38 V, FF was 0.62, and the module conversion efficiency was 5.0%.

EXAMPLE 20

A dye-sensitized solar cell module of Example 20 was produced in the same manner as Example 17, except that the width of the porous photoelectric conversion layers on the substrate X in the series connection direction was adjusted to be 4.4 mm.

The dye-sensitized solar cell module of Example 20 produced in the above described manner was put on a black stage in which the substrate Y side was controlled to be at 25° C. and the substrate X side was put in the light receiving face and the operation properties under the condition of simulating AM 1.5 sunlight were investigated to find that the short circuit current density was 11.8 mA/cm², the open circuit voltage value was 3.38 V, FF was 0.68, and the module conversion efficiency was 5.4%.

[Embodiment 5]

A dye-sensitized solar cell of Embodiment 5 is characterized in that first photoelectric conversion elements (a) and second photoelectric conversion elements (b) comprise different dyes to be adsorbed in the porous photoelectric conversion layers 2 and 12.

In Embodiment 5, the unit cells are produced in the same manner as Embodiment 1, except that the dyes to be adsorbed in the porous photoelectric conversion layers of the solar cell unit cells are different in the porous photoelectric conversion layer side which is the light receiving face and in the catalyst layer side which is the light receiving face.

The dyes to be used may be, as described above, various kinds of dyes having absorbance in the visible light region and/or the infrared ray region as dyes having interlock groups. Examples of organic dyes may include azo type dyes, quinine type dyes, quinoneimine type dyes, quinacridone type dyes, squarylium type dyes, cyanine type dyes, merocyanine type dyes, triphenylmethane type dyes, xanthene type dyes, porphyrin type dyes, perylene type dyes, indigo type dyes, and naphthalocyanine type dyes.

Among the above-mentioned organic dyes are merocyanine type dyes more preferable and NK2684 dye defined by the following formula (III) (manufactured by Hayashibara Biochem. Labs. Inc.), NKX2311 dye defined by the following formula (IV) (manufactured by Hayashibara Biochem. Labs. Inc.), NKX2569 dye defined by the following formula (V) (manufactured by Hayashibara Biochem. Labs. Inc.), and NKX2677 dye defined by the following formula (VI) (manufactured by Hayashibara Biochem. Labs. Inc.) more particularly preferable.

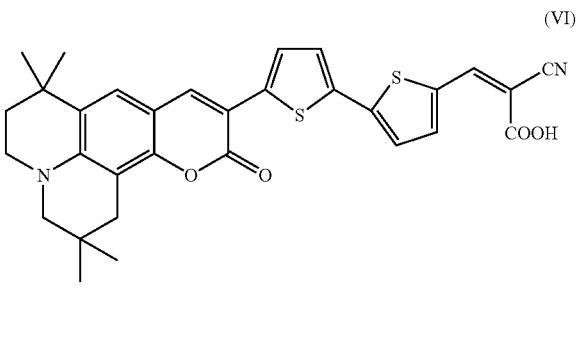
(VI)

In the case of metal complex dyes, metals such as Cu, Ni, Fe, Co, V, Sn, Si, Ti, Ge, Cr, Zn, Ru, Mg, Al, Pb, Mn, In, Mo, Y, Zr, Nb, Sb, La, W, Pt, Ta, Ir, Pd, Os, Ga, Tb, Eu, Rb, Bi, Se, As, Sc, Ag, Cd, Hf, Re, Au, Ac, Tc, Te, and Rh are employed and phthalocyanine type dyes and ruthenium bipyridine type dyes are preferably used.

Among the sensitizing dyes are ruthenium bipyridine type dyes more preferable and N3 dye defined by the following formula (VII) (trade name: Ruthenium 535, manufactured by Solaronix), N719 dye defined by the following formula (VIII) (trade name: Ruthenium 535-bisTBA, manufactured by Solaronix), and Black Dye defined by the above-mentioned formula (trade name: Ruthenium 620-1H3TBA, manufactured by Solaronix) more particularly preferable.

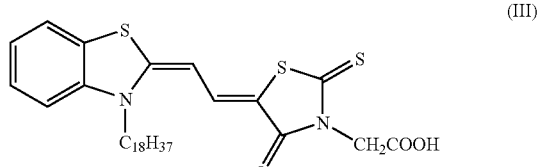
(III)

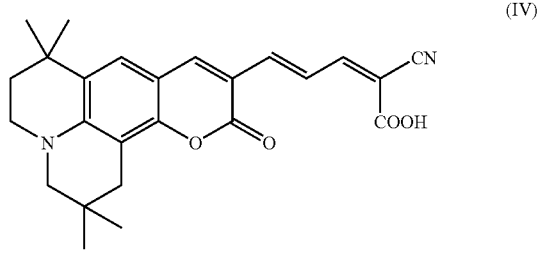
(IV)

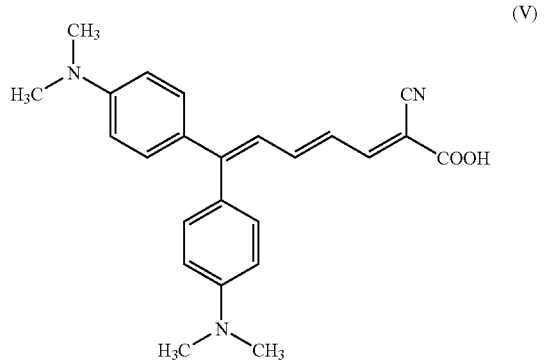
(V)

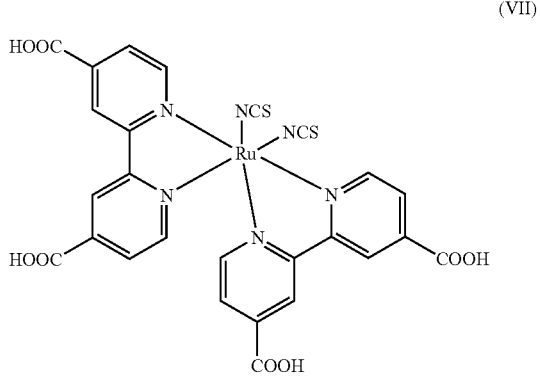
(VII)

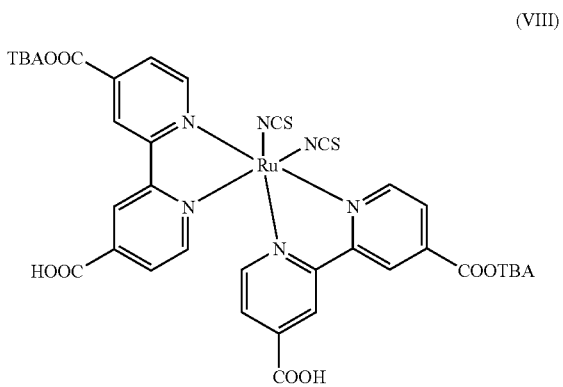
(VIII)

-continued

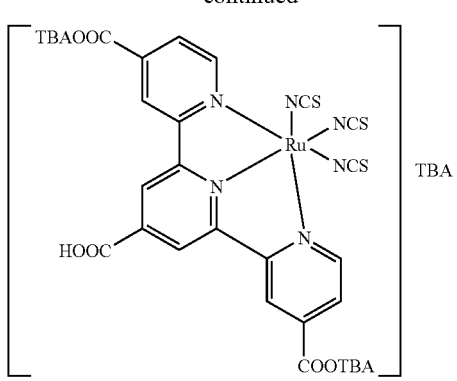

(II)

Next, using the unit cells composing a dye-sensitized solar cell module of Embodiment 5, the property changes in relation to the sensitizing dyes and the case the light receiving face is set in the catalyst layer side are confirmed.

At first, to confirm the property changes in accordance with the sensitizing dyes, the unit cells are produced in the following manner.

Substrates are produced by forming a 900 nm-thick film of $SnO_2$ as a conductive layer on one faces of glass substrates with thickness of 1.1 mm as a support and a titanium oxide paste (trade name: D/SP; manufactured by Solaronix) is applied in a form as to give a shape of 8 mm width×40 mm length×12 μm thickness after firing to the conductive layer by a screen printing apparatus (LS-150, manufactured by Newlong Seimitsu Kogyo Co., Ltd.), leveled at a room temperature for 1 hour and successively dried at 80° C. in an oven. After that, the paste is fired at 500° C. for 0.5 hours in air to form a 30 μm-thick porous photoelectric conversion layer on the substrates.

In the step of adsorbing a photosensitizing dye in the porous photoelectric conversion layer, the porous photoelectric conversion layer is immersed in a solution containing the photosensitizing dye to adsorb the photosensitizing dye in the surface of the porous photoelectric conversion layer.

Dye solutions in which the porous photoelectric conversion layer is to be immersed are produced as follows.

The NK2684 dye (defined by the formula (III); manufactured by Hayashibara Biochem. Labs. Inc.), NKX2311 dye (defined by the formula (IV); manufactured by Hayashibara Biochem. Labs. Inc.), NKX2569 dye (defined by the formula (V); manufactured by Hayashibara Biochem. Labs. Inc.), NKX2677 dye (defined by the formula (VI); manufactured by Hayashibara Biochem. Labs. Inc.), and N3 dye (defined by the formula (VII); manufactured by Solaronix) are dissolved in a concentration of $4×10^{-4}$ mole/l in ethanol. The N719 dye (defined by the formula (VIII); manufactured by Solaronix) is dissolved in a concentration of $4×10^{-4}$ mole/l in a solvent mixture of acetonitrile and tert-butanol mixed at 1:1 by volume. The Black Dye (defined by the formula (II); manufactured by Solaronix) is dissolved in a concentration of $4×10^{-4}$ mole/l in a solvent mixture of acetonitrile and tert-butanol mixed at 1:1 by volume and further, deoxycholic acid (DCA, manufactured by Aldrich) is dissolved in a concentration of $1×10^{-2}$ mole/l.

Porous semiconductor layers are immersed in the above-mentioned produced dye solutions at a room temperature for about 1 week to adsorb the dyes in the porous semiconductor layers.

On the other hand, a film of platinum with a width of 8 mm, a length of 40 mm, and a thickness of about 17 nm as a catalyst layer is deposited on the $SnO_2$ side of the above-mentioned substrates on which a $SnO_2$ film is formed. After that, the substrates are layered in a manner that the porous photoelectric conversion layer adsorbing the dye and the catalyst layer are set face to face and an electrolytic solution is poured between the porous photoelectric conversion layer and the catalyst layer. The electrolytic solution produced by dissolving 0.6 mole/l of DMPII; 0.1 mole/l of LiI, 0.5 mole/l of TBP, and 0.05 mole/l of $I_2$ in acetonitrile as a solvent is used.

In this connection, the catalyst layer and the porous photoelectric conversion layer adsorbing the dye are kept from each other by inserting a separator layer (trade name: Himilan, 50 μm, manufactured by Du Pont) between the catalyst layer and the porous photoelectric conversion.

Dye-sensitized solar cells are produced by using the above-mentioned electrolytic solution and subjected to solar cell measurement. The measurement is carried out by setting the light receiving face in the porous photoelectric conversion layer side and the catalyst layer side of each dye-sensitized solar cell. The results are shown in Table 15 (the porous photoelectric conversion layer side) and in Table 16 (the catalyst layer side).

TABLE 15

| Dye | Short circuit current density (mA/cm²) | Open circuit voltage value (V) | Fill factor | Conversion efficiency (%) |
|---|---|---|---|---|
| III | 11.4 | 0.63 | 0.65 | 4.7 |
| IV | 14.0 | 0.60 | 0.71 | 6.0 |
| V | 13.8 | 0.62 | 0.70 | 6.0 |
| VI | 15.0 | 0.71 | 0.68 | 7.2 |
| VII | 17.2 | 0.71 | 0.70 | 8.5 |
| VIII | 16.8 | 0.72 | 0.72 | 8.7 |
| II | 20.2 | 0.67 | 0.70 | 9.5 |

TABLE 16

| Dye | Short circuit current density (mA/cm²) | Open circuit voltage value (V) | Fill factor | Conversion efficiency (%) |
|---|---|---|---|---|
| III | 9.5 | 0.62 | 0.68 | 4.0 |
| IV | 11.6 | 0.59 | 0.74 | 5.1 |
| V | 11.5 | 0.61 | 0.73 | 5.1 |
| VI | 12.9 | 0.71 | 0.71 | 6.5 |
| VII | 14.3 | 0.71 | 0.71 | 7.2 |
| VIII | 13.9 | 0.71 | 0.73 | 7.3 |
| II | 16.8 | 0.67 | 0.73 | 8.2 |

From the results shown in Table 15 and Table 16, in the case of using dyes of II to VIII, it is confirmed that the short circuit current density is decreased in the case the light receiving face is set in the catalyst layer side because of the light absorption by the electrolytic solution and the decrease of the light transmittance of the catalyst layer/conductive layer. These values are supposed to change depending on the production conditions such as the electrolytic solution concentration, the thickness of the separator, the thickness of the transparent conductive film, the thickness of the catalyst layer, and the thickness of the porous photoelectric conversion layer, however the dyes may be selected so as to make the short circuit current density of the unit cell in which the catalyst layer is the light receiving face same as that of the unit cell in which the porous photoelectric conversion layer is the light receiving face.

Herein, using the solar cells produced in the above-mentioned manner for the investigations, a dye-sensitized solar cell module comprising two unit cells connected in series is produced and evaluated.

As a result, in the case a unit cell adsorbing the dye III in the first photoelectric conversion element and a unit cell adsorbing the dye IV in the second photoelectric conversion element are used, the short circuit current density is 11.6 (mA/cm$^2$), the open circuit voltage value is 1.22 (V), FF is 0.70, and the conversion efficiency is 5.0(%). Also in the case, the respective unit cells adsorbing the dye III are used, the short circuit current density is 10.2 (mA/cm$^2$), the open circuit voltage value is 1.26 (V), FF is 0.66, and the conversion efficiency is 4.2(%). Further in the case, the respective unit cells adsorbing the dye IV are used, the short circuit current density is 12.0 (mA/cm$^2$), the open circuit voltage value is 1.17 (V), FF is 0.70, and the conversion efficiency is 4.9(%).

Basically, in the case solar cells with different properties are connected in series, the voltage of the entire module is the total of the voltage values of the unit cells, however with respect to the electric current value, in the unit cell showing a low electric current value, the electron flow is deteriorated and therefore it is impossible to extract the electric current of the unit cell showing a high electric current value. Accordingly, in the case dye having the same capability for unit cells is used, the short circuit current density is high in the case the light receiving face is set in the porous photoelectric conversion layer side and the short circuit current density is low in the case the light receiving face is set in the catalyst layer side and therefore the output of the module in which the respective unit cells are connected in series is deteriorated and the durability is decreased. Therefore, the conversion efficiency and the durability of the module are improved by using a dye for the unit cell in which the light receiving face is set in the catalyst layer side, the dye capable of generating electric current relatively higher in the unit cell in which the light receiving face is set in the catalyst layer side than in the unit cell in which the light receiving face is set in the porous photoelectric conversion layer.

Further, it is made possible to further improve the conversion efficiency of the module by using a dye capable of generating high open circuit voltage in the unit cell in which the light receiving face is set in the porous photoelectric conversion layer.

Hereinafter, Embodiment 5 of the present invention will be described more in detail along with production example, examples, and comparative examples, however it is not intended that the present invention be limited to the illustrated production example, examples, and comparative examples. In the examples and comparative examples, unless otherwise specified, dye-sensitized solar cells are produced under the conditions of the production example.

EXAMPLE 21 AND ITS PRODUCTION EXAMPLE

A dye-sensitized solar cell module in which five unit cells were connected in series and integrated was produced. The production process will be described below (reference to FIG. 1 and FIG. 2).

Two SnO$_2$-bearing glass substrates manufactured by Nippon Sheet Glass Co., Ltd. were used as supports with a size of 59 mm×65 mm (substrate X) and with a size of 48 mm×65 mm (substrate Y) having conductive layers, respectively. In FIG. 2, platinum was deposited in a thickness of about 15 nm by sputtering as catalyst layers 23 in a manner that the widths of A, B, C, D, E, and F were to be 18 mm, 18 mm, 8 mm, 7 mm, 5 mm, and 5 mm, respectively.

Next, a titanium oxide paste (trade name: D/SP, manufactured by Solaronix) was applied in a form as to give a shape of 8 mm width×50 mm length×15 μm thickness after firing to the conductive layers by a screen printing apparatus (LS-150, manufactured by Newlong Seimitsu Kogyo Co., Ltd.), leveled at a room temperature for 1 hour, successively dried at 80° C. in an oven, and fired at 500° C. in air to form porous photoelectric conversion layers.

Next, laser beam (YAG laser: basic wavelength 1.06 μm) was radiated to SnO$_2$, conductive layers, in a manner that the widths of I, J, K, and L shown in FIG. 2 were to be 17.5 mm, 23.5 mm, 16.5 mm, and 10.5 mm to evaporate SnO$_2$ and form scribed grooves 21.

After that, the ruthenium dye defined by the above-mentioned formula (VIII) (trade name: Ruthenium 535-bisTBA, manufactured by Solaronix) was dissolved in a concentration of 4×10$^{-4}$ mole/l in a solvent mixture of acetonitrile and tert-butanol mixed at 1:1 by volume to produce a dye solution for adsorption and one of the substrates (X) was immersed in the solution. Also, the black dye defined by the above-mentioned formula (trade name: Ruthenium 620-IH3TBA, manufactured by Solaronix) was dissolved in a concentration of 4×10$^{-4}$ mole/l in a solvent mixture of acetonitrile and tert-butanol mixed at 1:1 by volume and further deoxycholic acid (DCA, manufactured by Aldrich) was dissolved in a concentration of 1×10$^{-2}$ mole/l to produce a dye solution for adsorption and the other substrate (Y) was immersed in the solution to adsorb the dye in the porous photoelectric conversion layer.

Next, while Himilan 1855 (manufactured by Du Pont) cut into a size of 1 mm×60 mm as an insulating layer 5 was put on the respectively scribed portions 21 of the substrates, the substrates X and Y subjected to the above-mentioned treatment were stuck to each other in the form shown in FIG. 1 and pressure bonded by heating at about 100° C. for 10 minutes in an oven.

Successively, as an electrolytic solution, an electrolytic solution was produced by dissolving 0.6 mole/l of DMPII, 0.1 mole/l of LiI, 0.5 mole/l of TBP, and 0.02 mole/l of I$_2$ in acetonitrile as a solvent.

The electrolytic solution was injected into the dye-sensitized solar cell module shown in FIG. 1 by a capillary effect and thereafter, the peripheral portions of the cells were sealed with an epoxy resin to produce the dye-sensitized solar cell module.

The produced dye-sensitized solar cell module was put on a black stage in which the substrate Y side was controlled to be at 25° C. and the substrate X side was put in the light receiving face and the operation properties under the condition of simulating AM 1.5 sunlight were investigated to find that the short circuit current density was 16.8 mA/cm$^2$, the open circuit voltage value was 3.50 V, FF was 0.72, and the module conversion efficiency was 8.5%.

COMPARATIVE EXAMPLE 7

A dye-sensitized solar cell module was produced in the same manner as the production example of the example, except that the dye 7 was used for both of the supporting bodies X and Y. The produced dye-sensitized solar cell module was put on a black stage in which the substrate Y side was controlled to be at 25° C. and the substrate X side was put in the light receiving face and the operation properties under the condition of simulating AM 1.5 sunlight were investigated to find that the short circuit current density was 17.1 mA/cm$^2$, the open circuit voltage value was 3.35 V, FF was 0.70, and the module conversion efficiency was 8.0%.

EXAMPLES 22 TO 24

The dye-sensitized solar cell modules were produced in the same manner as Example 21, except that the dyes to be adsorbed were changed. The results are shown in Table 17. The dyes employed for the respective Examples are shown in Table 18.

TABLE 17

| | Short circuit current density (mA/cm$^2$) | Open circuit voltage value (V) | FF | Conversion efficiency (%) |
|---|---|---|---|---|
| Example 22 | 17.3 | 3.47 | 0.70 | 8.4 |
| Example 23 | 11.6 | 3.11 | 0.68 | 4.9 |
| Example 24 | 14.6 | 3.58 | 0.70 | 7.3 |

TABLE 18

| | Supporting substrate X | Supporting substrate Y |
|---|---|---|
| Example 22 | Dye VII | Dye II |
| Example 23 | Dye III | Dye V |
| Example 24 | Dye VI | Dye VII |

EXAMPLE 25

The solar cell module produced in Example 21 and the solar cell module produced in Comparative Example 8 were put on a black stage in which the substrate Y side was controlled to be at 25° C. and the substrate X side was put in the light receiving face and a continuous irradiation experiment was carried out under the condition of simulating AM 1.5 sunlight radiation. The operation properties were measured after 150 hours to find that the conversion efficiency was 8.4% for the module of Example 17 and the conversion efficiency was 6.8% for the module of Comparative Example 6. It was confirmed that the amount of the electrolytic solution used in the module of Comparative Example 8 was decreased by eye observation. As described above, it is understood that integrated dye-sensitized solar cell modules of Examples 21 to 25 had the characteristics of the present invention and therefore, even in the case the size of the modules was as small as 59 mm×65 mm, high power dye-sensitized solar cell modules could be produced.

Embodiment 6

A dye-sensitized solar cell of Embodiment 6 is characterized in that the average particle diameters of the semiconductor particles composing the porous photoelectric conversion layers 2 and 12 of the first photoelectric conversion elements (a) and second photoelectric conversion elements (b) shown in FIG. 1 are different.

Practically, the average particle diameters of the semiconductor particles composing the porous photoelectric conversion layers 2 and 12 of the first photoelectric conversion elements (a) and second photoelectric conversion elements (b) are made different as described (15) to (18) below.

(15) The average particle diameter of the semiconductor particles composing the porous semiconductor layers of the first photoelectric conversion elements is smaller than the average particle diameter of the semiconductor particles composing the porous semiconductor layers of the second photoelectric conversion elements.

With such a constitution, the electric current of respective unit cells of the first photoelectric conversion layers and the second photoelectric conversion layers of the solar cell module can be efficiently be extracted.

(16) Each porous semiconductor layer of the second photoelectric conversion elements is composed of a plurality of layers and the average particle diameter of the semiconductor particles composing the layer nearest to the supporting substrate is larger than the average particle diameter of the semiconductor particles composing the layer farthest to the supporting substrate.

With such a constitution, a high conversion efficiency of the module can be obtained.

(17) The average particle diameter of the semiconductor particles composing the porous semiconductor layers of the first photoelectric conversion elements is 30 nm or smaller and the semiconductor particles with a particle diameter of 100 nm or larger are contained in the porous semiconductor layers of the second photoelectric conversion elements.

With such a constitution, a high conversion efficiency of the module can reliably be obtained.

(18) The porous semiconductor layer of each second photoelectric conversion element is composed of a plurality of layers and the semiconductor particles with a particle diameter of 100 nm or larger are contained in the porous semiconductor layer nearest to the supporting substrate and the porous semiconductor layer farthest from the supporting substrate is composed of the semiconductor particles with an average particle diameter of 30 nm or smaller.

Also with such a constitution, a high conversion efficiency of the module can reliably be obtained.

In Embodiment 6, the unit cells are produced in the same manner as Embodiment 1, except that the average particle diameters of the semiconductor particles composing the porous photoelectric conversion layers of the solar cell unit cells of Embodiment 1 are made different in the porous photoelectric conversion layer side which is the light receiving face and in the catalyst layer side which is the light receiving face.

Substrates are produced by forming a 900 nm-thick film of $SnO_2$ as a transparent conductive layer on one faces of glass substrates with a size of 10 mm width×50 mm length×1.1 mm thickness. Next, a titanium oxide paste containing no scattered particles with a particle diameter of 100 nm or larger (trade name: T/SP; manufactured by Solaronix; average particle diameter: 13 nm) and a titanium oxide paste containing scattered particles with a particle diameter of about 100 nm (trade name: D/SP; manufactured by Solaronix; average particle diameter: about 25 nm) are made available. The respective titanium oxide pastes are applied in a form as to give a shape of 5 mm width×50 mm length×10 μm thickness after firing to the respective transparent conductive layers of the above-mentioned two substrates by a screen printing apparatus (LS-150, manufactured by Newlong Seimitsu Kogyo Co., Ltd.), leveled at a room temperature for 1 hour and successively dried at 80° C. in an oven. After that, the paste is fired at 500° C. in air to form porous photoelectric conversion layers on the substrates.

The ruthenium dye defined by the formula (II) (trade name: Ruthenium 620-1H3TBA, manufactured by Solaronix) is dissolved in a concentration of $4\times10^{-4}$ mole/l in a solvent mixture of acetonitrile and tert-butanol mixed at 1:1 by volume to produce a dye solution for adsorption. The two type substrates in which the porous photoelectric conversion layers formed are immersed in the above-mentioned produced dye solution to adsorb the dyes in the porous semiconductor layers.

On the other hand, a film of platinum with a thickness of about 15 nm as a catalyst layer is deposited by sputtering on other substrates on which $SnO_2$ is formed. After that, the two substrates having the porous photoelectric conversion layer adsorbing the dyes and the two substrates having the catalyst layer are layered in a manner that the porous photoelectric conversion layer adsorbing the dye and the catalyst layer are set face to face through a separator (trade name: Himilan, 25 μm, manufactured by Du Pont) and an electrolytic solution is poured between the separator and the catalyst layer of each substrate.

The electrolytic solution produced by dissolving 0.6 mole/l of DMPII; 0.1 mole/l of LiI, 0.01 mole/l of $I_2$ and 0.5 mole/l of TBP in acetonitrile as a solvent is used.

In the above-mentioned manner, two types of cell units having different particle diameters of the semiconductor particles composing the porous photoelectric conversion layers are produced and subjected to solar cell property measurement by radiating light to the porous photoelectric conversion layer side and the catalyst layer side of the respective cell units. The results of the case that the light radiating face is set in the porous photoelectric conversion layer side are shown in Table 19 and the results of the case that the light radiating face is set in the catalyst layer side are shown in Table 20.

TABLE 19

(Light receiving face: in porous photoelectric conversion layer side)

| | Existence of scattered particles in porous semiconductor layer | |
|---|---|---|
| | Absence | Presence |
| Short circuit current density (mA/cm$^2$) | 12.4 | 15.0 |
| Open circuit voltage value (V) | 0.71 | 0.68 |
| FF | 0.70 | 0.66 |
| Conversion efficiency (%) | 6.2 | 6.7 |

TABLE 20

(Light receiving face: in catalyst layer side)

| | Existence of scattered particles in porous semiconductor layer | |
|---|---|---|
| | Absence | Presence |
| Short circuit current density (mA/cm$^2$) | 9.9 | 12.0 |
| Open circuit voltage value (V) | 0.68 | 0.66 |
| FF | 0.71 | 0.68 |
| Conversion efficiency (%) | 4.8 | 5.4 |

From the results shown in Table 19 and Table 20, in the case the light receiving face is set in the porous photoelectric conversion layer side, if the particle diameter of the semiconductor particles composing the porous photoelectric conversion layers is increased, the electric current density is increased, however on the contrary, the open circuit voltage is decreased. On the other hand, in the case the light receiving face is set in the catalyst layer side, the current density is decreased as compared with that of the case the light is radiated from the porous photoelectric conversion layer side. It is supposedly attributed to that the quantity of light reaching the porous photoelectric conversion layer adsorbing the dye is decreased owing the light absorption in the catalyst layer and the electrolytic solution in the case the light receiving face is set in the catalyst layer side.

In the case a dye-sensitized solar cell module is produced using the electrolytic solution composition (the electrolytic solution concentration is same in the respective unit cells) according to a conventional technique and the above-mentioned unit cells, from the experiment results shown in Table 19 and Table 20, if the scattered particles with a particle diameter of 100 nm or larger are contained, the short circuit current is 30.0 mA in the case the light receiving face is set in the porous photoelectric conversion layer side and 24.0 mA in the case the light receiving face is set in the catalyst layer side. Since the short circuit current of a series connection type module is controlled on the basis of the unit cells having the lowest short circuit current value, the electric current value in the case the light receiving face is set in the porous photoelectric conversion layer side cannot be utilized advantageously.

In Embodiment 6 of the present invention, therefore, in the unit cell in which the light receiving face is set in the porous photoelectric conversion layer side and the unit cell in which the light receiving face is set in the catalyst layer side, two kind unit cells; one containing no scattered particle with a particle diameter of 100 nm is contained (light receiving face: in the porous photoelectric conversion layer side) and the other containing scattered particles with a particle diameter of 100 nm are contained (light receiving face: in the catalyst layer side); are used so as to compose the porous photoelectric conversion layers with different semiconductor particle diameters and accordingly the difference of the short circuit current value in the respective unit cells can be decreased to about 0.4 mA and approximately same output can be obtained from the respective unit cells and the generated electric current can be utilized advantageously.

Hereinafter, Embodiment 6 of the present invention will be described more in detail along with production example, examples, and comparative examples, however it is not intended that the present invention be limited to the illustrated production example, examples, and comparative examples. In the examples and comparative examples, unless otherwise specified, dye-sensitized solar cells are produced under the conditions of the production example.

EXAMPLE 26 AND ITS PRODUCTION EXAMPLE

A dye-sensitized solar cell module (reference to FIG. 1) in which five unit cells were connected in series and integrated was produced in the same manner as Example 1, except that the electrolytic solution and the average particle diameter of the semiconductor particles composing the porous photoelectric conversion layers were changed. Hereinafter, only the different points of the production example of Example 26 from Example 1 will be described.

As shown in FIG. 2, on two portions of a catalyst layer formation region on a transparent conductive layer 1 of a substrate X and three portions of a catalyst layer formation region on a conductive layer 5 on a substrate Y, platinum was deposited in a form of 5 mm width×50 mm length×5 nm thickness as catalyst layers 4 and 14 by sputtering method using a metal mask.

Next, a titanium oxide paste containing no scattered particles with a particle diameter of 100 nm or larger (trade name: T/SP, manufactured by Solaronix; average particle diameter: 13 nm) was applied in a form as to give a shape of 5 mm width×50 mm length×15 μm thickness after firing to the three portions in the porous semiconductor layer formation part on the transparent conductive layer 1 on the substrate X by a screen printing apparatus (LS-150, manufactured by Newlong Seimitsu Kogyo Co., Ltd.), leveled at a room temperature for 1 hour, successively dried at 80° C. in an oven, and fired at 500° C. in air to form a porous photoelectric conversion layer 2.

On the other hand, a titanium oxide paste containing scattered particles with a particle diameter about 100 nm (trade name: D/SP, manufactured by Solaronix) was applied to the two portions in the porous semiconductor layer formation part on the conductive layer 5 on the substrate Y in the same method as the porous photoelectric conversion layer 2 to form a porous semiconductor layer 12.

An electrolytic solution produced by dissolving 0.6 mole/l of DMPII, 0.1 mole/l of LiI, 0.05 mole/l of $I_2$, and 0.5 mole/l of TBP in acetonitrile as a solvent was used as the electrolytic solution.

The current-voltage characteristic of the produced dye-sensitized solar cell module was investigated by setting the light receiving face in the substrate X under the condition of simulating AM 1.5 sunlight to find that the short circuit current density was 12.2 mA/cm$^2$, the open circuit voltage value was 3.3 V, FF was 0.63, and the module conversion efficiency was 5.1%.

COMPARATIVE EXAMPLE 8

A dye-sensitized solar cell module of Comparative Example 9 was produced in the same manner as Example 26, except that the titanium oxide paste containing scattered particles with an average particle diameter of 13 nm (trade name: T/SP, manufactured by Solaronix) was used for the semiconductor particles for the porous photoelectric conversion layers of all of the unit cells of the dye-sensitized solar cell module.

The current-voltage characteristic of the produced dye-sensitized solar cell module was investigated by setting the light receiving face in the substrate X under the condition of simulating AM 1.5 sunlight to find that the short circuit current density was 9.8 mA/cm$^2$, the open circuit voltage value was 3.3 V, FF was 0.64, and the module conversion efficiency was 4.1%.

It is understood by comparison of Example 26 with Comparative Example 9, if the particle diameter of the semiconductor particles in the unit cells in which the light receiving face is set in the porous photoelectric conversion layer side and the particle diameter of the semiconductor particles in the unit cells in which the light receiving face is set in the catalyst layer side are made different, particularly if the diameter is made smaller in the porous photoelectric conversion layer side than in the catalyst layer side, a high conversion efficiency can be obtained.

EXAMPLE 27

Figure 6:
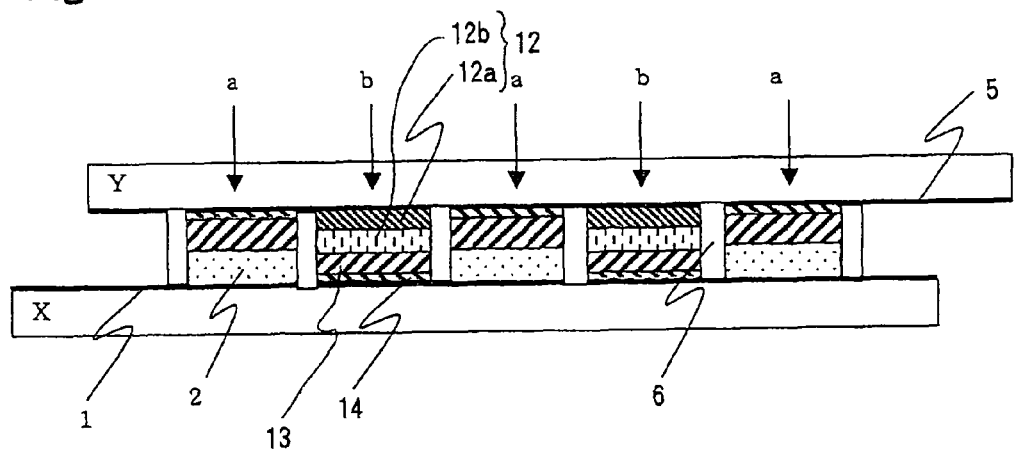
FIG. 6 is a schematic cross-sectional view showing a dye-sensitized solar cell module of Embodiment 6 of the present invention.
Figure 7:
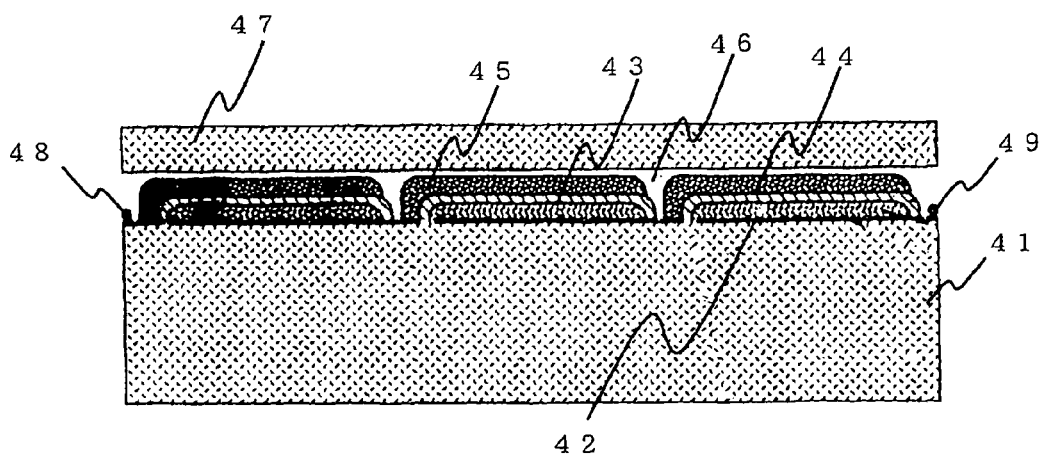
FIG. 7 is a schematic cross-sectional view showing a conventional dye-sensitized solar cell.
Figure 8:
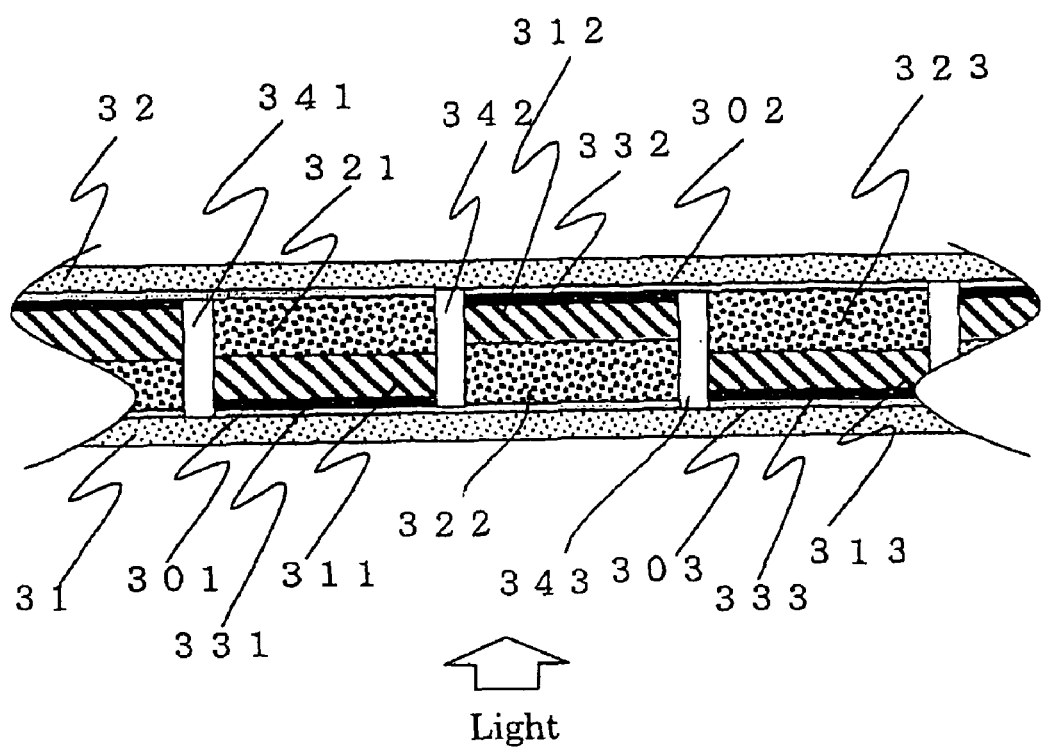
FIG. 8 is a schematic cross-sectional view showing a conventional dye-sensitized solar cell.

A dye-sensitized solar cell module of Example 27 was produced in the same manner as Example 26, except that each porous photoelectric conversion layer 12 of the unit cells (b) on the substrate Y was composed of two layers containing semiconductor particles with different particle diameters. A schematic cross-sectional view of the dye-sensitized solar cell module of Example 27 is shown in FIG. 6. The same symbols are assigned to the same components in FIG. 1 and FIG. 6. Hereinafter, only the points of the production process of Example 27 different from Example 26 will be described below with reference to FIG. 6.

A titanium oxide paste containing scattered particles with a particle diameter about 100 nm (trade name: D/SP, manufactured by Solaronix) was applied in a form as to give a shape of 5 mm width×50 mm length×7 μm thickness after firing to the two portions in the porous semiconductor layer formation part on the conductive layer 5 on the substrate Y by a screen printing apparatus (LS-150, manufactured by Newlong Seimitsu Kogyo Co., Ltd.), leveled at a room temperature for 1 hour, successively dried at 80° C. in an oven, and fired at 500° C. in air to form a first porous photoelectric conversion layer 12a. After that, on the porous photoelectric conversion layer 12a, a titanium oxide paste containing titanium oxide particles with a particle diameter about 13 nm (trade name: T/SP, manufactured by Solaronix) was applied in a form as to give a shape of 5 mm width×50 mm length×7 μm thickness after firing by a screen printing apparatus (LS-150, manufactured by Newlong Seimitsu Kogyo Co., Ltd.), leveled at a room temperature for 1 hour, successively dried at 80° C. in an oven, and fired at 500° C. in air to form a second porous photoelectric conversion layer 12b.

The current-voltage characteristic of the produced dye-sensitized solar cell module was investigated by setting the light receiving face in the substrate X under the condition of simulating AM 1.5 sunlight to find that the short circuit current density was 12.5 mA/cm$^2$, the open circuit voltage value was 3.4 V, FF was 0.64, and the conversion efficiency was 5.4%.

It is understood from Example 18, if the porous photoelectric conversion layer is composed of a plurality of layers in the unit cells in which the light receiving face is set in the catalyst layer side and the respective layers are composed semiconductor particles with different particle diameters, a high conversion efficiency can be obtained.

EXAMPLES 28 TO 30

Dye-sensitized solar cell modules of Examples 28 to 30 were produced in the same manner as Example 26, except the particle diameter of the semiconductor particles of the porous photoelectric conversion layers 2 in the light receiving face side was changed to be 20 nm (Example 28), 30 nm (Example 29), and 50 nm (Example 30).

Practically, in Example 28, a titanium oxide paste produced by dispersing 4.0 g of commercialized titanium oxide particles (trade name: Super Titania F5 grade, anatase type crystal; average particle diameter 20 nm; manufactured by Showa-Titanium Co., Ltd.) in 15 ml of diethylene glycol monomethyl ether by using glass beads and a paint shaker for 6 hours was used and the paste was applied by a doctor blade method, leveled at a room temperature for 1 hour, successively dried at 80° C. in an oven, and fired at 500° C. in air to form the porous semiconductor layer 2.

In Example 29, the porous semiconductor layer 2 was formed in the same manner as Example 28, except that titanium oxide particles (trade name: Super Titania F4 grade, anatase type crystal; average particle diameter 30 nm; manufactured by Tayca Corp.) were used.

In Example 30, the porous semiconductor layer 2 was formed in the same manner as Example 28, except that titanium oxide particles (trade name: Super Titania F5 grade, anatase type crystal; average particle diameter 50 nm; manufactured by Showa-Titanium Co., Ltd.) were used.

The current-voltage characteristic of the produced dye-sensitized solar cell modules of Examples 28 to 30 was investigated by setting the light receiving face in the substrate X under the condition of simulating AM 1.5 sunlight and the results are shown in Table 21.

TABLE 21

|  | Example 28 | Example 29 | Example 30 |
|---|---|---|---|
| Particle diameter of semiconductor particles composing porous semiconductor layer | 20 | 30 | 50 |

TABLE 21-continued

|  | Example 28 | Example 29 | Example 30 |
|---|---|---|---|
| Short circuit current density (mA/cm$^2$) | 12.3 | 12.4 | 11.7 |
| Open circuit voltage value (V) | 3.4 | 3.3 | 3.2 |
| FF | 0.64 | 0.63 | 0.63 |
| Conversion efficiency (%) | 5.4 | 5.2 | 4.7 |

From Table 21, in the solar cell modules of the present invention, it is preferable that the average particle diameter of semiconductor particles composing the porous photoelectric conversion layer in the light receiving face side is 30 nm or smaller since 5% or higher photoelectric conversion efficiency can be achieved.

EXAMPLES 31 TO 33

Dye-sensitized solar cell modules of Examples 31 to 33 were produced in the same manner as Example 27, except the particle diameter of the semiconductor particles of the porous photoelectric conversion layers 2 in the light receiving face side was changed to be 20 nm (Example 31), 30 nm (Example 32), and 50 nm (Example 33).

Practically, in Example 31, a titanium oxide paste produced by dispersing 4.0 g of commercialized titanium oxide particles (trade name: Super Titania F5 grade, anatase type crystal; average particle diameter 20 nm; manufactured by Showa-Titanium Co., Ltd.) in 15 ml of diethylene glycol monomethyl ether by using glass beads and a paint shaker for 6 hours was used and the paste was applied by a doctor blade method, leveled at a room temperature for 1 hour, successively dried at 80° C. in an oven, and fired at 500° C. in air to form the porous semiconductor layer 2.

In Example 32, the porous semiconductor layer 2 was formed in the same manner as Example 31, except that titanium oxide particles (trade name: Super Titania F4 grade, anatase type crystal; average particle diameter 30 nm; manufactured by Tayca Corp.) were used.

In Example 33, the porous semiconductor layer 2 was formed in the same manner as Example 31, except that titanium oxide particles (trade name: Super Titania F5 grade, anatase type crystal; average particle diameter 50 nm; manufactured by Showa-Titanium Co., Ltd.) were used.

The current-voltage characteristic of the produced dye-sensitized solar cell modules of Examples 31 to 33 was investigated by setting the light receiving face in the substrate X under the condition of simulating AM 1.5 sunlight and the results are shown in Table 22.

TABLE 22

|  | Example 31 | Example 32 | Example 33 |
|---|---|---|---|
| Particle diameter of semiconductor particles composing porous semiconductor layer | 20 | 30 | 50 |
| Short circuit current density (mA/cm$^2$) | 12.6 | 12.4 | 11.8 |
| Open circuit voltage value (V) | 3.4 | 3.4 | 3.2 |
| FF | 0.64 | 0.63 | 0.62 |
| Conversion efficiency (%) | 5.5 | 5.3 | 4.7 |

From Table 22, in the solar cell modules of the present invention, it is preferable that the average particle diameter of semiconductor particles composing the porous photoelectric conversion layer in the light receiving face side is 30 nm or smaller since 5% or higher photoelectric conversion efficiency can be achieved even in the case the porous photoelectric conversion layer in the non-light receiving face side is composed of a plurality of layers.

[Embodiment 7]

A dye-sensitized solar cell of Embodiment 7 is characterized in that the form of the catalyst layers 4 and 14 of the first photoelectric conversion elements (a) and second photoelectric conversion elements (b) shown in FIG. 1 are different and accordingly the light transmittance of the catalyst layers 14 of the second photoelectric conversion elements (b) is lower than the light transmittance of the catalyst layers 4 of the first photoelectric conversion elements (a).

Practically, the light transmittance of the catalyst layers 14 of the second photoelectric conversion elements (b) is made lower than the light transmittance of the catalyst layers 4 of the first photoelectric conversion elements (a) as described (19) to (22) below.

(19) The catalyst layers of the second photoelectric conversion elements have aperture parts shape.

With such a constitution, the light transmittance of the catalyst layers 14 of the second photoelectric conversion elements (b) can be made further lower than the light transmittance of the catalyst layers 4 of the first photoelectric conversion elements (a) and as a result, a high module conversion efficiency can be obtained.

Practically, the each shape having the aperture parts is described bellow.

(20) The catalyst layers of the second photoelectric conversion elements have a lattice-like shape.

(21) The catalyst layers of the second photoelectric conversion elements have a stripe shape.

(22) The catalyst layers of the second photoelectric conversion elements have a dotted shape.

Also with such a constitution, a high module conversion efficiency can be obtained.

EXAMPLE 34

A dye-sensitized solar cell module of Example 34 was produced by connecting and integrating five unit cells in the same manner as Embodiment 1, except the shape of the catalyst in the second photoelectric conversion elements in the solar cell units of the first embodiment 1 is changed.

Two SnO$_2$-bearing glass substrates (X substrate, Y substrate) manufactured by Nippon Sheet Glass Co., Ltd. were used as supports with a size of 55 mm×65 mm (X substrate) and with a size of 54 mm×65 mm (Y substrate) having conductive layers, respectively. Platinum was deposited by sputtering in form of a lattice with an electrode wire width W of 0.04 μm as the catalyst layer 4 in the substrate Y in a manner that the widths of A, B, C, D, E, and F were to be 15 mm, 14 mm, 8 mm, 10 mm, 5 mm, and 5 mm, respectively, in FIG. 2. The catalyst layer 4 formed in the above-mentioned manner had 0.8 as the P defined by the above-mentioned Equation (2).

Next, a titanium oxide paste (trade name: D/SP, manufactured by Solaronix) was applied in a form as to give a shape of 8 mm width×50 mm length to the conductive layers by a screen printing apparatus (LS-150, manufactured by Newlong Seimitsu Kogyo Co., Ltd.), leveled at a room temperature for 1 hour, successively dried at 80° C. in an oven, and fired at 500° C. in air to form porous photoelectric conversion layers. The thickness of titanium oxide was 20 μm.

Next, laser beam (YAG laser: basic wavelength 1.06 μm) was radiated to SnO$_2$ conductive layers, in a manner that the widths of I, J, K, and L shown in FIG. 2 were to be 14.5 mm, 22.5 mm, 22.5 mm, and 13.5 mm to evaporate SnO$_2$ and form scribed grooves 21.

After that, the ruthenium dye defined by the formula (VIII) (trade name: Ruthenium 719, manufactured by Solaronix) was dissolved in a concentration of $4\times10^{-4}$ mole/l in a solvent mixture of acetonitrile and tert-butanol mixed at 1:1 by volume to produce a dye solution for adsorption and the dye was adsorbed in the porous photoelectric conversion layers by immersing the layers in the dye solution for adsorption.

Next, while Himilan 1855 (manufactured by Du Pont) cut into a size of 1 mm×60 mm as an insulating layer 5 was put on the respectively scribed portions 21 of the substrates, the substrates X and Y subjected to the above-mentioned treatment were stuck to each other in the form shown in FIG. 1 and pressure bonded by heating at about 100° C. for 10 minutes.

Successively, an electrolytic solution was produced by dissolving 0.6 mole/l of HMII, 0.1 mole/l of LiI, 0.5 mole/l of TBP, and 0.01 mole/l of $I_2$ in acetonitrile as a solvent.

The electrolytic solution was injected into the unit cells (a) and the unit cells (b) of the dye-sensitized solar cell module shown in FIG. 1 by capillary effect and thereafter, the peripheral portions of the cells were sealed with an epoxy resin to produce the dye-sensitized solar cell module.

The operation properties of the produced dye-sensitized solar cell module were investigated by setting the light receiving face in the substrate X under the condition of simulating AM 1.5 sunlight to find that the short circuit current density was 41.5 mA/cm², the open circuit voltage value was 3.5 V, FF was 0.58, and the module conversion efficiency was 4.2%.

EXAMPLE 35

According to Example 34, the shape of the catalyst layers 4 of the second photoelectric conversion elements (b) was formed to be stripes with an electrode wire width W of 0.04 μm. The catalyst layers 4 had 0.8 as the P defined by the above-mentioned Equation (2).

The operation properties of the produced dye-sensitized solar cell module were investigated under the condition of simulating AM 1.5 sunlight to find that the short circuit current density was 42.0 mA/cm², the open circuit voltage value was 3.5 V, FF was 0.59, and the module conversion efficiency was 4.3%.

EXAMPLE 36

The dye-sensitized solar cell module of Example 36 was produced in the same manner as Example 35, except the shape of the catalyst layers 4 of the second photoelectric conversion elements (b) was formed into dots so as to adjust the light transmittance to be 70%.

The operation properties of the produced dye-sensitized solar cell module were investigated under the condition of simulating AM 1.5 sunlight to find that the short circuit current density was 43.5 mA/cm², the open circuit voltage value was 3.5 V, FF was 0.58, and the module conversion efficiency was 4.4%.

COMPARATIVE EXAMPLE 9

The dye-sensitized solar cell module of Comparative Example 10 was produced in the same manner as Example 35, except catalyst layers 4 of the respective second photoelectric conversion elements (b) of the solar cell unit cells had no aperture part and the thickness was controlled to be 17 nm.

The operation properties of the produced dye-sensitized solar cell module were investigated under the condition of simulating AM 1.5 sunlight to find that the short circuit current density was 37.4 mA/cm², the open circuit voltage value was 3.5 V, FF was 0.59, and the module conversion efficiency was 3.9%.

As described, even through having a module size as small as 55 mm×65 mm, the integrated dye-sensitized solar cell modules of Examples 35 and 36 were found having high conversion efficiency since they had the characteristics of the present invention.

The invention claimed is:

1. A dye-sensitized solar cell module comprising:
   first photoelectric conversion elements each comprising a transparent conductive layer, a porous photoelectric conversion layer adsorbing a dye, an electrolytic layer, a catalyst layer, and a conductive layer laminated in this order on a transparent substrate;
   second photoelectric conversion elements each comprising a transparent conductive layer, a catalyst layer, an electrolytic layer, a porous photoelectric conversion layer adsorbing a dye, and a conductive layer laminated in this order on a transparent substrate;
   the transparent substrate defining a transparent substrate side of the conversion elements; and
   a supporting substrate formed on the respective conductive layers of the first and second photoelectric conversion elements that define a supporting substrate side of the conversion elements,
   wherein one or more first photoelectric conversion elements and one or more second photoelectric conversion elements are alternately arranged in parallel between the transparent substrate and the supporting substrate, and the neighboring first photoelectric conversion elements and second photoelectric conversion elements are electrically connected in series;
   the neighboring first photoelectric conversion element and second photoelectric conversion element both electrically connected in series are arranged orthogonal to the thickness of the dye-sensitized solar cell module;
   the transparent substrate side of the conversion elements being a light receiving side of the conversion elements and the supporting substrate side of the conversion elements being a non-light receiving side; and wherein
   the first photoelectric conversion elements and the second photoelectric conversion elements being different in at least one among the composition of the electrolytic layers; the thickness of the porous photoelectric conversion layers; the width of the porous photoelectric conversion layers; the average particle diameter of the semiconductor particles composing the porous photoelectric conversion layers, in order that the first and second photoelectric conversion elements provide substantially the same amount of the electric current, and when the short circuit current density of the first photoelectric conversion elements is defined as Jd and the short circuit current density of the second photoelectric conversion elements is defined as Jc, (Jc/Jd)>0.7 is satisfied.

2. The dye-sensitized solar cell module according to claim 1, wherein a short circuit current of the second photoelectric conversion elements in the case where a light receiving face thereof is set in the porous photoelectric conversion layer side opposite the catalyst layer side is greater than a short circuit current of the first photoelectric conversion elements in the case where a light receiving face thereof is set in the porous photoelectric conversion layer side opposite the catalyst layer side.

3. The dye-sensitized solar cell module according to claim 1, wherein the first photoelectric conversion elements and the second photoelectric conversion elements contain iodine in the respective electrolytic layers and the iodine concentration in the electrolytic layers of the second photoelectric conversion elements is lower than the iodine concentration in the electrolytic layers of the first photoelectric conversion elements.

4. The dye-sensitized solar cell module according to claim 3, wherein the ratio M1/M2 of the iodine concentration M1 in the electrolytic layers of the first photoelectric conversion elements and the iodine concentration M2 in the electrolytic layers of the second photoelectric conversion elements is higher than 1 and not higher than 5.

5. The dye-sensitized solar cell module according to claim 1, wherein the first photoelectric conversion elements and the second photoelectric conversion elements respectively contain imidazoles or imidazolium salts in their electrolytic layers, the imidazole or imidazolium salt contained in each of the electrolytic layers of the first photoelectric conversion elements being different from that contained in each of the electrolytic layers of the second photoelectric conversion elements.

6. The dye-sensitized solar cell module according to claim 5, wherein the imidazoles or imidazolium salts contained in the respective electrolytic layers of the first photoelectric conversion elements and the second photoelectric conversion elements differ in concentration.

7. The dye-sensitized solar cell module according to claim 5, wherein the imidazolium salts are salts of compounds defined by the following formula (I):

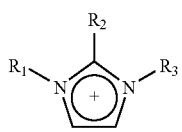

wherein $R_1$ and $R_2$ independently denote a hydrogen atom or methyl; $R_3$ denotes methyl, ethyl, propyl, butyl, or hexyl.

8. The dye-sensitized solar cell module according to claim 1, wherein either the first photoelectric conversion elements or the second photoelectric conversion elements contain lithium iodide in the electrolytic layer thereof.

9. The dye-sensitized solar cell module according to claim 1, wherein the thicknesses of the porous photoelectric conversion layers of the first photoelectric conversion elements and the second photoelectric conversion elements differ.

10. The dye-sensitized solar cell module according to claim 1, wherein the thicknesses of the porous photoelectric conversion layers of the first photoelectric conversion elements are thinner than the thicknesses of the porous photoelectric conversion layers of the second photoelectric conversion elements.

11. The dye-sensitized solar cell module according to claim 1, wherein the light receiving surface areas of the respective porous photoelectric conversion layers of the first photoelectric conversion elements and the second photoelectric conversion elements differ.

12. The dye-sensitized solar cell module according to claim 11, wherein the light receiving surface areas of the respective porous photoelectric conversion layers of the second photoelectric conversion elements are larger than the light receiving surface areas of the respective porous photoelectric conversion layers of the first photoelectric conversion elements.

13. The dye-sensitized solar cell module according to claim 11, wherein the widths of the respective porous photoelectric conversion layers of the first photoelectric conversion elements and the second photoelectric conversion elements differ in the series connection direction of the solar cells.

14. The dye-sensitized solar cell module according to claim 11, wherein the light receiving surface areas of the respective porous photoelectric conversion layers of a plurality of the first photoelectric conversion elements are the same and the light receiving surface areas of the respective porous photoelectric conversion layers of a plurality of the second photoelectric conversion elements are the same.

15. The dye-sensitized solar cell module according to claim 1, wherein a first dye is adsorbed in the respective porous photoelectric conversion layers of a plurality of the first photoelectric conversion elements and a second dye different from the first dye is adsorbed in the respective porous photoelectric conversion layers of a plurality of the second photoelectric conversion elements.

16. The dye-sensitized solar cell module according to claim 1, wherein an open circuit voltage of the first photoelectric conversion elements and an open circuit voltage of the second photoelectric conversion elements differ.

17. The dye-sensitized solar cell module according to claim 16, wherein open circuit voltage values of the first photoelectric conversion elements are higher than open circuit voltage values of the second photoelectric conversion elements.

18. The dye-sensitized solar cell module according to claim 1, wherein the average particle diameter of the semiconductor particles of the porous semiconductor layers of the first photoelectric conversion elements is smaller than the average particle diameter of the semiconductor particles of the porous semiconductor layers of the second photoelectric conversion elements.

19. The dye-sensitized solar cell module according to claim 18, wherein the porous semiconductor layer of at least each of the second photoelectric conversion elements is composed of a plurality of layers and the average particle diameter of the semiconductor particles in the porous semiconductor layer closest to the supporting substrate is larger than the average particle diameter of the semiconductor particles in the porous semiconductor layer farthest from the supporting substrate.

20. The dye-sensitized solar cell module according to claim 19, wherein the average particle diameter of the semiconductor particles of the porous semiconductor layers of the first photoelectric conversion elements is 30 nm or smaller and the semiconductor particles with a particle diameter of 100 nm or larger are contained in the porous semiconductor layers of the second photoelectric conversion elements.

21. The dye-sensitized solar cell module according to claim 20, wherein the porous semiconductor layer of each of the second photoelectric conversion elements is composed of a plurality of layers and the semiconductor particles with a particle diameter of 100 nm or larger are contained in the porous semiconductor layer closest to the supporting substrate and the semiconductor particles with an average particle diameter of 30 nm or smaller are contained in the porous semiconductor layer farthest from the supporting substrate.

22. The dye-sensitized solar cell module according to claim 1, wherein the light transmittance of the catalyst layers of the second photoelectric conversion elements is lower than the light transmittance of the catalyst layers of the first photoelectric conversion elements.

23. The dye-sensitized solar cell module according to claim 22, wherein the catalyst layers of the second photoelectric conversion elements have apertures.

24. The dye-sensitized solar cell module according to claim 23, wherein the catalyst layers of the second photoelectric conversion elements have a lattice-like shape.

25. The dye-sensitized solar cell module according to claim 23, wherein the catalyst layers of the second photoelectric conversion elements have a stripe shape.

26. The dye-sensitized solar cell module according to claim 23, wherein the catalyst layers of the second photoelectric conversion elements have a dotted shape.

27. The dye-sensitized solar cell module according to claim 1, wherein the catalyst layers contain Pt.

28. The dye sensitized solar cell module according to claim 15, wherein a ruthenium dye defined by the formula (VIII):

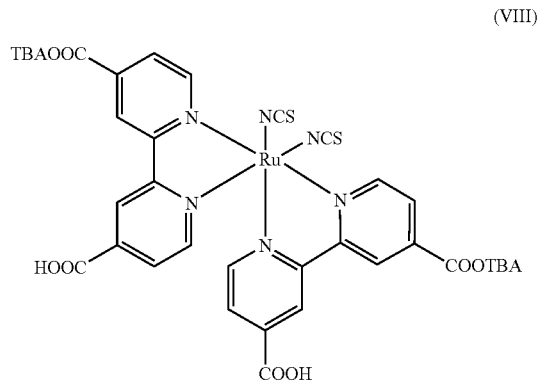

(VIII)

is adsorbed on the respective porous photoelectric conversion layers of a plurality of the first photoelectric conversion elements and a black dye defined by the formula (II):

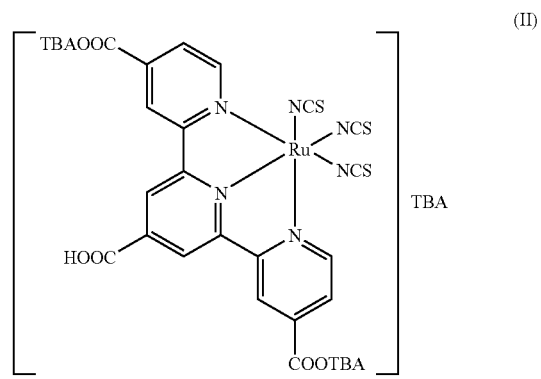

(II)

is adsorbed on the respective porous photoelectric conversion layers of a plurality of the second photoelectric conversion elements.

* * * * *